(12) United States Patent
Than et al.

(10) Patent No.: US 10,192,187 B2
(45) Date of Patent: Jan. 29, 2019

(54) COMPARISON OF CLIENT AND BENCHMARK DATA

(71) Applicant: Visier Solutions, Inc., Vancouver (CA)

(72) Inventors: Hlaing Tun Than, Vancouver (CA); Timothy Atkinson, West Vancouver (CA); Ryan Wayne Hanna, Vancouver (CA)

(73) Assignee: Visier Solutions, Inc., Vancouver, British Columbia ( * ) Notice: Subject to any disclaimer, the term of this patent is extended or adjusted under 35 U.S.C. 154(b) by 0 days.

(21) Appl. No.: 14/147,145

(22) Filed: Jan. 3, 2014

(65) Prior Publication Data
US 2015/0193719 A1    Jul. 9, 2015

(51) Int. Cl.
*G06Q 10/06* (2012.01)

(52) U.S. Cl.
CPC .............................. *G06Q 10/06398* (2013.01)

(58) Field of Classification Search
CPC .................................................. G06Q 10/0639
See application file for complete search history.

(56) References Cited

U.S. PATENT DOCUMENTS

| | | | |
|---|---|---|---|
| 2002/0184067 A1* | 12/2002 | McLean et al. | 705/7 |
| 2004/0039619 A1* | 2/2004 | Zarb | 705/7 |
| 2004/0260685 A1* | 12/2004 | Pfleiger | G06F 17/30914 |
| 2005/0071680 A1 | 3/2005 | Bukary et al. | |
| 2005/0160057 A1 | 7/2005 | Wefers et al. | |
| 2005/0182703 A1* | 8/2005 | D'hers et al. | 705/35 |
| 2005/0216436 A1* | 9/2005 | Thomsen | 707/1 |
| 2007/0299743 A1* | 12/2007 | Staib et al. | 705/27 |
| 2009/0157447 A1* | 6/2009 | Busch | 705/7 |
| 2009/0182602 A1* | 7/2009 | Black et al. | 705/7 |
| 2009/0210942 A1* | 8/2009 | Abel | 726/20 |

(Continued)

FOREIGN PATENT DOCUMENTS

| | | |
|---|---|---|
| WO | 01/067342 A1 | 9/2001 |
| WO | 2005065299 A2 | 7/2005 |

OTHER PUBLICATIONS

BLS Introduces New Employer Costs for Employee Compensation Data for Private Industry Workers in 15 Metropolitan Areas; Albert E. Schwenk; Sep. 28, 2009.*

(Continued)

*Primary Examiner* — Deirdre D Hatcher
(74) *Attorney, Agent, or Firm* — Toler Law Group, PC

(57) ABSTRACT

Systems and methods of performing comparisons of client data and benchmark data are described. When client data is compared to internal benchmark data, comparative result values may be computed by performing a multidimensional operation with respect to client data for a particular dimension member and client data for additional dimension members that are related to the particular dimension member. When client data is compared to external benchmark data, a client result value may be computed based on a multidimensional operation and a benchmark result value may be determined based on a mapping of client dimension members to benchmark dimension members. The result values may be provided by a server to a client, which may generate a graphical user interface (GUI) based on the result values.

20 Claims, 14 Drawing Sheets

(56) References Cited

U.S. PATENT DOCUMENTS

| | | | |
|---|---|---|---|
| 2011/0213778 A1* | 9/2011 | Hess | G06F 17/30545 |
| | | | 707/740 |
| 2011/0276355 A1* | 11/2011 | Bruce et al. | 705/7.12 |
| 2013/0046569 A1 | 2/2013 | Miller et al. | |
| 2013/0197675 A1 | 8/2013 | McCarthy et al. | |
| 2013/0246133 A1* | 9/2013 | Dembo | G06Q 10/06 |
| | | | 705/14.1 |
| 2014/0156666 A1* | 6/2014 | Jagtiani | G06F 17/30707 |
| | | | 707/740 |

OTHER PUBLICATIONS

DLLR Local Area Unemployment Statistics; Oct. 2012.*

* cited by examiner

COMPARISON OF CLIENT AND BENCHMARK DATA

BACKGROUND

Business enterprises often use computer systems to store and analyze large amounts of data. For example, an enterprise may maintain databases to store data related to sales, inventory, accounting, human resources, etc. To gauge the performance of various organizations within the enterprise, analysts may compare performance metrics for the organization to internal benchmarks (e.g., other organizations) and external benchmarks (e.g., industry-wide data). When the performance metrics are multidimensional, providing analysts with a comparison between enterprise data and benchmark data may be difficult and computationally complex.

SUMMARY

The present disclosure describes systems and methods of performing comparisons of client data and benchmark data, such as internal benchmark data or external benchmark data. In response to a user selecting a measure (e.g., a performance metric) and a benchmark, a server may determine values of the measure based on a set of client data and based on benchmark data retrieved from an external data source. The set of client data may correspond to an organization, a location, etc. selected by the user. The server may also compute the value of the measure based on additional sets of client data, where the additional sets of client data correspond to other organizations, locations, etc. The determined values may be provided to a client application for use in generating a graphical user interface that includes a comparative visualization, such as a bar graph, a line graph, etc.

For example, a user may belong to or select a "Products" organization of an enterprise. The user may select a measure, such as a ratio of minority employees to total employees (also referred to herein as "minority ratio"). The user may also select a corresponding benchmark. The benchmark may be an "internal" benchmark, such as the minority ratio of other organizations within the enterprise, or an "external" benchmark, such as an average minority ratio determined by a government agency (e.g., the United States Equal Employment Opportunity Commission (EEOC)).

To provide a meaningful comparison of client data to benchmark data, dimensions of the client data are mapped to dimensions of the benchmark data. In a first example, the user may elect to compare the minority ratio in the "Products" organization to a "Sales" organization that is a peer of the "Products" organization. Because data for both organizations is part of the same client data set, the same multi-dimensional operations (e.g., queries) may be executed to determine the minority ratio for each organization. The user may be provided with a visual comparison of the minority ratio in the "Products" organization to the minority ratio in the "Sales" organization.

As a second example, the user may elect to compare the minority ratio in the "Products" organization in various US states to the EEOC-determined average minority ratio in those states. However, benchmark data available from the EEOC may not have the same dimension names and members as the client data. The server may maintain mapping tables that map client dimension members to external benchmark dimension members. To illustrate, in client data, members of the location dimension in the client data may include California, New York, Texas, etc. If the benchmark data is only available on a nationwide basis, the mapping tables may map each state to the same benchmark dimension member "US." The user may be provided with a visual comparison of the minority ratio in the "Products" organization in each state to the national average minority ratio. In accordance with the present disclosure, client data and benchmark data may be retrieved and analyzed on-the-fly to enable rapid resolution of analysis queries to determine how different aspects of a dimension member (e.g., a "Products" organization) compare to other dimension members (e.g., a "Sales" organization) and to external benchmarks.

DETAILED DESCRIPTION

Figure 1:
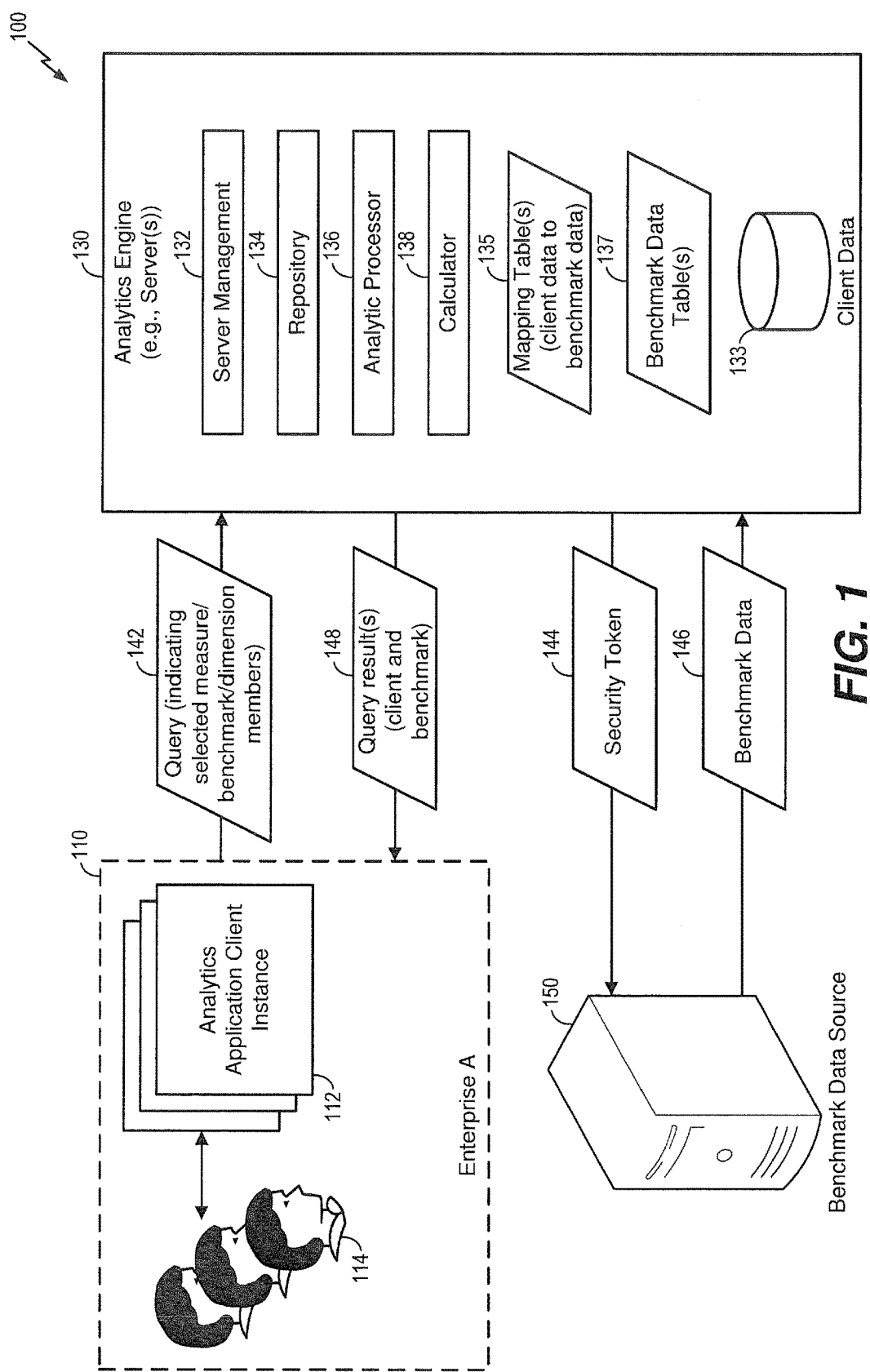
FIG. 1 is a diagram of a particular embodiment of a system that is operable to perform multidimensional comparison of client and benchmark data.

Referring to FIG. 1, a particular embodiment of a system 100 that is operable to perform a comparison of client data to benchmark data is shown. The system 100 includes a client-server analytics platform. The client portion of the platform is illustrated in FIG. 1 by client instances 112. The server portion of the platform is illustrated in FIG. 1 by an analytics engine 130.

In a particular embodiment, each of the client instances 112 may be a "thin" client application, such as an Internet-accessible web application, that presents graphical user interfaces (GUIs) based on communication with the analytics engine 130. In FIG. 1, the analytics platform is available to an Enterprise A 110 (e.g., a company, a corporation, or other entity). The Enterprise A 110 is associated with one or more users 114 (e.g., employees) that have the ability to execute the one or more client instances 112. Each of the users 114 may log in to a website or web application corresponding to a client instance 112 using a browser of a computing device, such as a desktop computer, a laptop computer, a mobile phone, a tablet computer, etc.

It should be noted that although a single enterprise 110 is shown in FIG. 1, in alternate embodiments, any number of enterprises and client instances may be present in the system 100. Each enterprise 110 may provide the analytics platform (e.g., the client instances 112 and/or the analytics engine 130) access to client data 133. For example, the enterprise 110 may upload the client data 133 to the analytics engine 130. The uploaded data may be "cleaned" (e.g., via data integrity checks and error-correction operations), transformed, and loaded into an in-memory database at the analytics engine 130. The client data 133 may represent internal enterprise data that is analyzed by the analytics platform. For example, when the analytics platform is a workforce analytics platform, the client data 133 may represent internal databases that store data regarding employee compensation, diversity, organizational structure, employee performance, recruiting, employee retention, retirement, etc.

The analytics engine 130 may be configured to receive queries from the client instances 112, execute the queries, and provide results of executing the queries to the client instances 112. In a particular embodiment, the analytics engine 130 includes a server management module 132 that is configured to manage a server environment and provide interfaces to handle requests. For example, the server management module 132 may communicate with the client instances 112. In a particular embodiment, the communication is performed via scripts, servlets, application programming interfaces (APIs) (e.g., a representational state transfer (REST) API), etc. The server management module 132 may also expose services and/or data to the client instances 112. For example, exposed services and data may include query output, session and user account management services, server administration services, etc. The server management module 132 is further described with reference to FIG. 2.

The analytics engine 130 may also include a repository 134. In a particular embodiment, the repository 134 stores models, such as data models and processing models. The models may include query declarations and metric definitions, as further described with reference to FIG. 2. The analytics engine 130 may further include an analytics processor 136 and a calculator 138. The analytics processor 136 may be configured to coordinate lookup and function call operations during query execution, as further described with reference to FIG. 2. The calculator 138 is configured to access data (e.g., in-memory data cubes) to calculate the value of functions and metrics, as further described with reference to FIG. 2.

The analytics engine 130 may also store the client data 133, one or more mapping table(s) 135, and one or more benchmark data tables 137. The benchmark data tables 137 may be multidimensional data tables, where each table includes one or more dimension columns and a value column. For example, a benchmark data table may store minority ratio data collected by the United States Equal Employment Opportunity Commission (EEOC). The benchmark data table may include various columns, including an industry column, a location column, and a value column. If a particular row in the table has a value "Electrical Equipment, Appliance, and Component Manufacturing (EEACM)" in the industry column, a value "TX" in the location column, and a value "55.9%" in the value column, this indicates that the average minority ratio in Texas in the EEACM industry was found to be 55.9%. A particular embodiment of a method of generating benchmark data tables is further described with reference to FIG. 3. Examples of benchmark data tables are further described with reference to FIG. 4.

The mapping tables 135 may map dimensions (e.g., columns) and dimension members of the client data 133 to dimensions and dimension members of the benchmark data tables 137. Examples of dimensions and dimension members are further described with reference to FIG. 2. The mapping tables 135 may be automatically generated based on a standardized ontology of dimension members and/or programmed by a system administrator or other personnel associated with the analytics engine 130. Client data from different enterprises may have different dimensions and dimension members. The mapping tables 135 may be used to determine which benchmark dimensions correspond to which client dimension for each set of client data stored by the analytics engine 130. A particular embodiment of a method of generating mapping tables is further described with reference to FIG. 3. Examples of mapping tables are further described with reference to FIG. 4.

The enterprise 110 may acquire access to the analytics platform (e.g., via a purchase, a license, a subscription, or by another method). During operation, one of the users 114 may log in to one of the client instances 112. The analytics platform may support analysis regarding a set of semantic items. A "semantic item" may be a high-level concept that is associated with one or more terms (or lingo), questions, models, and/or metrics. For example, in the context of workforce analytics, semantic items may be associated with terms such as "employee," "organization," "turnover," etc. The semantic items may also be associated with business questions such as "What is the turnover in the 'Products' organization'?", "What is the 'Cost' of 'Employee' in the 'Sales' organization in 'North America' in 'First Quarter, 2012'?", "How is my 'Cost' 'now' compared to 'the same period last year'?", etc. The semantic items may further be associated with business models, such as models for cost of turnover, indirect sales channel revenue, etc. Semantic items may include metrics or key performance indicators (KPIs), such as revenue per employee, cost per employee, etc.

When the user 114 logs in to a particular client instance 112, the client instance 112 may display a graphical user interface (GUI) that is operable to generate various data analysis queries to be executed by the analytics engine 130. For example, the particular client instance 112 may send a query 142 to the analytics engine 130. The query 142 may identify a selected measure and a selected benchmark for comparison.

In the context of a workforce analytics application, the selected measure and benchmark may include an employee diversity measure and benchmark, an employment cost measure and benchmark, or a recruiting effectiveness or employee retention measure and benchmark. An employee diversity measure may be associated with a minority ratio, a female ratio, a turnover rate of minority employees, a resignation rate of minority employees, a promotion rate of minority employees, and/or an external hire rate of minority employees. Examples of an employee diversity benchmark include benchmarks based on data collected by the EEOC. An employment cost measure may be associated with a salary cost, a benefits cost, a paid leave cost, a supplemental pay cost, and/or an insurance cost. Examples of an employment cost benchmark include Employer Costs for Employee Compensation (ECEC) benchmarks based on data collected by the US Bureau of Labor Statistics (BLS). Recruiting/retention measures may be associated with a time to fill (an available employee position), a turnover rate, and/or a retention rate. Examples of unemployment benchmarks include benchmarks based on Local Area Unemployment Statistics (LAUS) collected by the BLS.

It should be noted that although various embodiments are described herein with reference to a workforce analytics application and US benchmarks, this is for example only and not to be considered limiting. In alternate embodiments, the described techniques may be used to compare client data and non-US benchmark data in other types of applications (e.g., sales, finance, etc.).

The analytics engine 130 may receive the query 142 (e.g., via a network, such as a local area network (LAN), a wide area network (WAN), the Internet, etc.). The query 142 may identify a selected measure and a selected benchmark. The selected benchmark may be an external benchmark or an internal benchmark. Examples of operation for both types of benchmarks are provided herein.

As an example of operation with reference to an external benchmark, a particular user 114 is part of or selects a "Products" organization of the enterprise 110. The "Products" organization includes employees in various US states, including California (CA), Colorado (CO), Illinois (IL), New York (N.Y.), and Texas (TX). The user 114 may wish to view a visual comparison of the minority ratio of the "Products" organization in each of the aforementioned states to the average (EEOC-determined) minority ratio in those states. Thus, in this example, the query 142 identifies minority ratio as the selected measure and EEOC-determined average minority ratio as the selected benchmark.

In response to receiving the query 142, the analytics engine 130 may determine client result values of the selected measure. For example, the analytics engine 130 may generate and populate a multidimensional cube with client data 133 corresponding to employees in the "Products" organization. The analytics engine 130 may determine the minority ratio for the "Products" organization for each of the aforementioned states based on the cube. Populating multidimensional cubes and using such cubes to evaluate measures is further described with reference to FIG. 2. The analytics engine 130 may also determine benchmark result values of the selected measure. For example, the analytics engine 130 may populate a multidimensional cube with benchmark data from the benchmark data tables 137, and may use the cube to determine the EEOC average minority ratio for each of the aforementioned states. The analytics engine 130 may send the computed client result values and the benchmark result values to the client instance 112 as query results 148. The client instance 112 may use the client result values and benchmark result values to generate a GUI that illustrates how the minority ratio in the "Products" organization compares to the EEOC-determined average minority ratio on a state-by-state basis. An example of such a GUI is further described with reference to FIG. 7.

In a particular embodiment, the analytics engine 130 may be configured to compute a benchmark value based on a model stored in the analytics engine (e.g., in the repository 134). Computing benchmark values may be useful for extrapolating missing data points or for otherwise combining data points. Whether a benchmark value is computed based on a model or directly retrieved from benchmark data may be determined based on the implementation of each individual benchmark measure.

In a particular embodiment, the benchmark data tables 137 are populated based on benchmark data 146 received from an external benchmark data source 150 (e.g., a government-owned server, a cloud-based storage system, etc.).

In a particular embodiment, the benchmark data 146 is retrieved and the benchmark data tables 137 and mapping tables 135 are populated prior to receipt of the query 142. Alternately, selected benchmark data 146 is retrieved from the external benchmark data source 150 in response to the query 142.

In a particular embodiment, users may generally be restricted from accessing external data and external applications when using the client instance 112. To enable the use of the external benchmark data 146, a security token 144 may be used to establish trust between the client instance 112 and an external benchmarking application. For example, the security token 144 may be a shared secret, a shared key, an encrypted value, etc. In one implementation, each application supported by the analytics engine 130 may maintain a list of trusted applications to which data may be provided and/or from which data may be received. The analytics engine 130 (or alternately, the client instance 112) may generate and send the security token 144 to the benchmark data source 150, and the benchmark data source 150 may verify the security token 144 prior to providing the benchmark data 146.

As an example of operation with reference to an internal benchmark, the "Products" organization includes a hierarchy of sub-organizations, including "Manufacturing" and "Research & Development (R&D)," and the "R&D" sub-organization is further classified into "R&D Hardware" and "R&D Software." The user 114 may wish to compare a recruiting measure, such as time to fill, for the "R&D Software" organization with other organizations in the enterprise 110. Thus, in this example, the query 142 identifies time to fill as the selected measure. Instead of an external benchmark, the query 142 identifies other (e.g., peer, ancestor, or descendant) organization(s), whose time(s) to fill serve as internal benchmark(s).

In an alternate embodiment, the peer, ancestor, and/or descendant organizations of a particular organization may be automatically identified. For example, the client instance 112 and/or the analytics engine 130 may maintain an organizational hierarchy for the enterprise 110. Because the query 142 indicates that the user 114 is a member of, or has selected, the "R&D Software" organization, the "R&D Hardware" organization may automatically be identified as a peer of the "R&D Software" organization. Similarly, the "R&D" organization may be identified as an ancestor of the "R&D Software" organization, and the "Products" organization may be identified as an ancestor of the "R&D" organization. In a particular embodiment, the user 114 is associated with an enterprise role (e.g., employee, manager, vice-president, etc.) and/or a security level. If certain peer or ancestor organizations are unavailable to the enterprise role or security level of the user 114, then measures may not be evaluated for the unavailable peer or ancestor organizations.

In response to receiving the query 142, the analytics engine 130 may determine the time to fill for the "R&D Software" organization based on a first multidimensional cube that is populated with client data 133 for the "R&D Software" organization. The analytics engine 130 may also determine benchmark result value(s) for each applicable peer, ancestor, and/or descendant organization that is available to the user 114. For example, the analytics engine 130 may populate a second multidimensional cube with client data 133 for a particular peer/ancestor/descendant organization and may use the second multidimensional cube to determine the time to fill for that peer/ancestor/descendant organization. Alternately, when client data for multiple organizations includes the same dimensions, the same multidimensional cube may be used. Examples of populating and using a multidimensional cube are further described with reference to FIG. 2. The analytics engine 130 may send the computed client and benchmark result values to the client instance 112 as the query results 148. The client instance 112 may use the received values from the query results 148 to generate a GUI that illustrates how the time to fill in the "R&D Software" organization compares to the time to fill of various peer, ancestor, and/or descendant organizations. An example of such a GUI is further described with reference to FIG. 11.

In some embodiments, the query results 148 may be based on a combination of internal and external benchmark data. For example, the user 114 may wish to see how the minority ratio in the "Products" organization and each peer organization (internal benchmark data) compare to the average EEOC-determined minority ratio (external benchmark data). An example of such a GUI is further described with reference to FIG. 8.

The system 100 of FIG. 1 may thus automatically identify peers, ancestors, and descendants of a user-selected dimension member (e.g., organization) and compute comparative internal benchmarks for the user-selected dimension member. The system 100 of FIG. 1 may also map client data dimensions to benchmark data dimensions and compute external benchmarks for comparison to the user-selected dimension member. Further, the system 100 of FIG. 1 may provide users with visual, readily comprehensible reports that illustrate how different aspects of an organization compare to the internal and external benchmarks.

Figure 2:
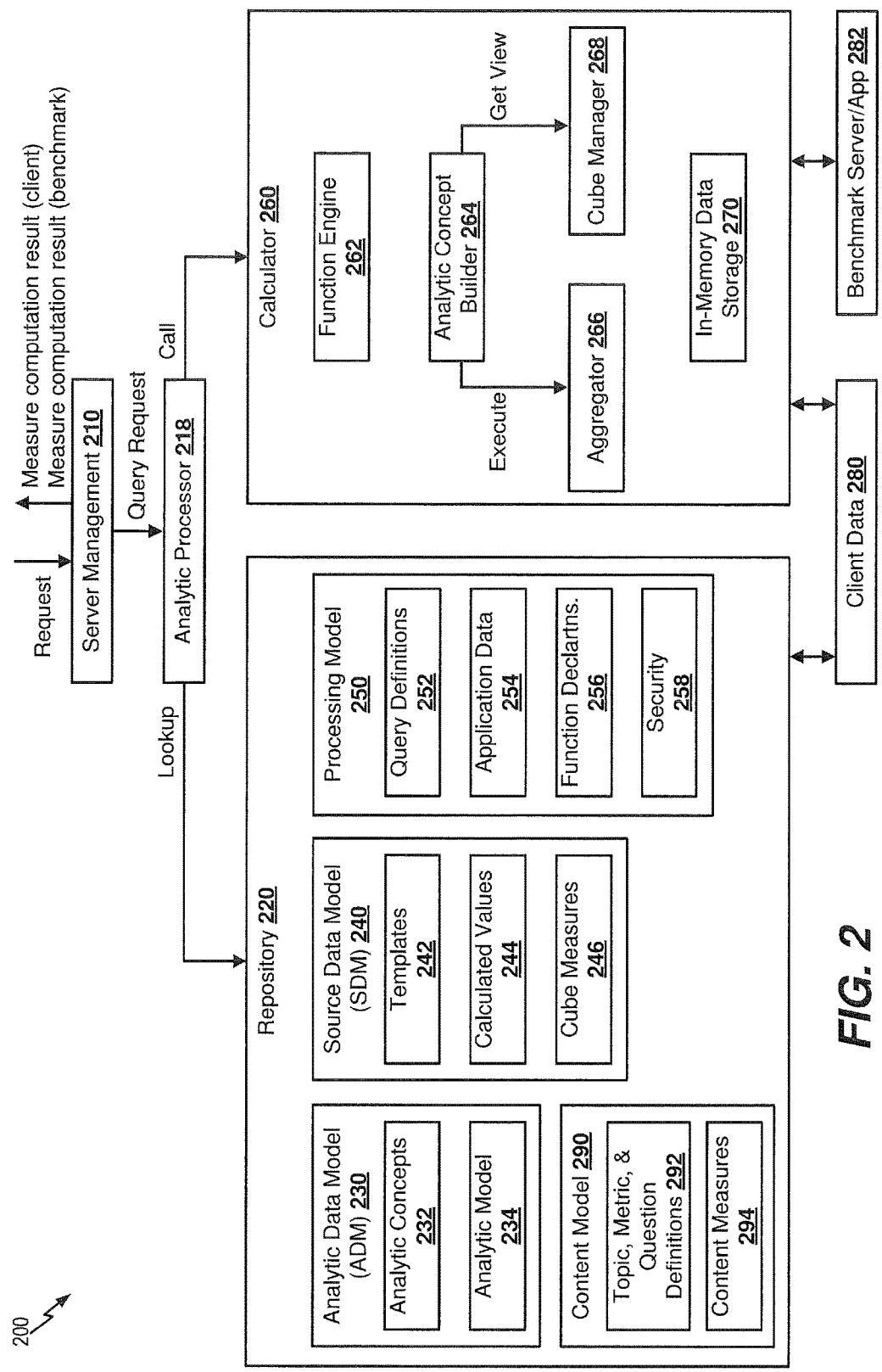
FIG. 2 is a diagram of a particular embodiment of an analytics engine of the system of FIG. 1.

FIG. 2 is a diagram to illustrate a particular embodiment of an analytics engine 200. In an illustrative embodiment, the analytics engine 200 corresponds to the analytics engine 130 of FIG. 1. The analytics engine 200 may include a server management module 210 (e.g., corresponding to the server management module 132 of FIG. 1), an analytic processor (e.g., corresponding to the analytic processor 136 of FIG. 1), a repository 220 (e.g., corresponding to the repository 134 of FIG. 1), and a calculator 260 (e.g., corresponding to the calculator 138 of FIG. 1). In a particular embodiment, each component of the analytics engine 200 corresponds to hardware and/or software (e.g., processor executable instructions) configured to perform particular functions described herein. In one example, the analytics engine 200 corresponds to a server-side architecture of an analytics platform and is implemented by one or more servers, such as web servers and/or data servers.

The server management module 210 may be configured to manage a server environment and entry points that are exposed to clients, such as the client instances 112 of FIG. 1. For example, client requests may be in the form of query requests, i.e., requests to execute specific queries on client data 280. The results of executing a specified query may be used by the client instances 112 to generate particular business analysis interfaces, reports, etc.

The analytic processor 218 may be configured to manage various operations involved in query execution. For example, the analytic processor 218 may perform lookup operations with respect to the repository 220 and call (e.g., a function call) operations with respect to the calculator 260. The repository 220 may store various data models and data definitions that are referenced during query execution. For example, the repository 220 may store an analytic data model (ADM) 230, a source data model (SDM) 240, a processing model 250, and a content model 290.

The SDM 240 may define a maximal set of dimensions and fact tables that can be constructed from a particular client data set (e.g., the client data 280). A dimension may be a field that can be placed on an axis of a multidimensional data cube that is used to execute a query, as further described herein. For example, "Location" may be a dimension, and members of the "Location" dimension may include "US," "UK," and "Canada." It should be noted that there may be multiple levels of a dimension. For example, the "US" dimension may include a second level that includes the members "Texas," "New York," and "California." Another example of a dimension is "Organization," as described with reference to FIG. 1 regarding a "Products" organizational hierarchy. A fact table may be a collection of facts, where facts correspond to data points (e.g., database entries) and occupy the cells of a multidimensional data cube.

In addition to dimensions and fact tables, the SDM 240 may include fact table templates 242, calculated values 244, and cube measures 246 (alternately referred to as "fact table measures"). The fact table templates 242 may define a maximal set of dimensions, measures, and calculated values that can be used to construct a particular multidimensional data cube. The calculated values 244 may be represented by functions that accept a fact as input and output a calculated value to be appended to that fact. For example, given the value "Salary" in a fact table, a "Ten times Salary" calculated value may append a value to each fact equal to ten times the value of the "Salary" of that fact. As another example, "Tenure" may be a calculated value that does not exist in the client data 280 as a static value. Instead, a "Tenure" calculated value may accept an employee hire date and a specified date as input and may return a value representing the employee's tenure on the specified date. The cube measures 246 may be functions that accept a set of facts as input and output a value. For example, given all employees in Canada as input, a "Sum of Salary" measure may output the sum of salaries of all Canadian employees. As another example, a "Count" measure may count all of the facts in a set of cells and return the count. Measures that represent a performance assessment (e.g., key performance indicators (KPIs)) are also referred to herein as metrics.

The ADM 230 may include analytic concepts 232 and an analytic model 234. The analytic concepts 232 may be functions that accept an application context as input and output a set of dimension members. In a particular embodiment, application context may be dynamically adjusted by a user, as further described with reference to FIG. 3. The analytic model 234 may represent a set of mathematical formulae that can be used during query execution, as further described herein.

The processing model 250 may include query definitions 252, application data 254, function declarations 256, and security modules 258. Each query may be associated with a query definition 252 that includes a set of function calls, measures, and parameter values. The query definition 252 may thus define an execution path to be used by the analytic processor 218 to generate the result of the query. In a particular embodiment, queries may be classified as analytic queries or data connectors. Analytic queries may not be executable until all required fact tables are available. In contrast, data connector queries may be executed independent of fact table availability and may be used to populate fact tables. For example, a data connector query may be executed to load data into in-memory data storage 270 from a database, a web service, a spreadsheet, etc.

To illustrate, "Cost of Turnover" may be a business concept corresponding to a sequence of operations that returns a scalar value as a result. A "Cost of Turnover" query may accept the result of a "Turnover" query as input, and the "Turnover" query may accept an "Organization" and a "Date Range" as input. Thus, a query that computes that the Cost of Turnover for a Product Organization during the 2011-2012 year is $373,000 may be represented as:

Cost of Turnover (Turnover (Organization ("Product", "2011-2012")))=$373,000 where "Product" and "2011-2012" are parameters and "Organization" and "Turnover" are analytic queries. Thus, higher-order business concepts, such as "Cost of Turnover," may be bound to queries that can be chained together. The query definitions 252 may include definitions for lower-order and higher-order queries.

The application data 254 may be maintained for each client instance (e.g., the client instances 112 of FIG. 1). The application data 254 for a specific client instance may include server configurations and security policies for the client instance. The application data 254 for a specific client instance may also include a source data model, an analytic data model, and a processor model for the client instance. When the client instance is initialized by a user, the analytics engine 200 may use the application data 254 for the client instance and for the user to determine what databases are available and what data (e.g., from client data 280) should be loaded into the in-memory data storage 270 by data connector queries.

The function declarations 256 may be associated with functions called by the analytic processor 218. For example, the functions may include data transformations or aggregation functions, such as functions to execute a formula, to execute a computation over data representing a calendar year, etc. The functions may also include fetch functions, such as structured query language (SQL) fetch, web service fetch, spreadsheet fetch, etc. The functions may further include exporting functions, such as spreadsheet export and SQL export, and custom (e.g., user defined) functions.

The security modules 258 may implement query security and organizational security. In a particular embodiment, to implement query security, each measure (e.g., cube measure 246 and/or content measure 294) may be bound to one or more queries, and each user may have a particular security level and/or enterprise role. Different security levels and enterprise roles may be assigned access to different measures. Prior to execution of a query, the security modules 258 may determine whether the user requesting execution of the query meets a minimum security level/enterprise role required to access the measures bound to the query. If the user does not meet the security requirements, the analytics engine 200 may return an error message to the requesting client instance.

Organizational security may be applied on the basis of the organization(s) that a user has access to. For example, the manager of the "Products" organization may have access to products-related information, but may not have access to a "Legal" organization. The security modules 258 may grant a user access to information for the user's organization and all organizations descending from the user's organization.

The content model 290 may include definitions 292 for topics and metrics. For example, in the context of workforce analytics, the definitions 292 may include definitions for various human resources (HR) topics and metrics, as well as definitions for questions and analytic concepts associated with such topics and metrics. The content model 290 may also include definitions for content measures 294. Whereas the cube measures 246 are defined with respect to a cube, the content measures 294 may be derived from or built upon a cube measure. For example, given the "Sum of Salary" cube measure described above, a "Sum of Salaries of Employees 50 years or older" content measure can be derived from or built upon the "Sum of Salary" cube measure. Various topics, metrics, and/or questions defined in the definitions 292 may reference the "Sum of Salaries of Employees 50 years or older" content measure.

The calculator 260 may include a function engine 262, an analytic concept builder 264, an aggregator 266, a cube manager 268, and the in-memory data storage (e.g., random access memory (RAM)) 270. The function engine 262 may be used by the analytic processor 218 to load and execute the functions 256. In a particular embodiment, the function engine 262 may also execute user-defined functions or plug-ins. A function may also recursively call back to the analytic processor 218 to execute sub-functions.

When a query requires a set of values corresponding to different dates (e.g., to generate points of a trend chart), the function engine 262 may split a query into sub-queries. Each sub-query may be executed independently. Once results of the sub-queries are available, the function engine 262 may combine the results to generate an overall result of the original query (e.g., by using a "UnionOverPeriod" function). The overall result may be returned to the requesting client instance via the server management module 210.

The analytic concept builder 264 may be a processing function called by the analytic processor 218 to communicate with the calculator 260. If a particular query cannot be evaluated using a single multidimensional cube operation, the query may be split into smaller "chunk" requests. Each chunk request may be responsible for calculating the result of a chunk of the overall query. The analytic concept builder 264 may call back to the analytic processor 218 with chunk requests, and the calculator 260 may execute the chunk requests in parallel. Further, when a large amount of client data 280 is available, the client data 280 may be divided into "shards." Each shard may be a subset of the client data 280 that matches a corresponding filter (e.g., different shards may include data for different quarters of a calendar year). Shards may be stored on different storage devices (e.g., servers) for load-balancing purposes. If a query requests values that span multiple shards (e.g., a query that requests data for a calendar year), the analytic concept builder 264 may split the query into chunk requests and call back into the analytic processor 218 with a chunk request for each shard.

The cube manager 268 may generate, cache, and lookup cube views. A "cube view" includes a multidimensional cube along with one or more constraints that provide semantics to the cube. For example, given a cube containing all employee states at all times, the constraint "Date=2012-07-01" can be added to the cube to form a cube view representing the state of all employees as of Jul. 1, 2012. The cube manager 268 may receive a request for a particular cube view from the analytic concept builder 264. If the requested cube view is available in cache, the cube manager 268 may return the cached cube view. If not, the cube manager 268 may construct and cache the cube view prior to returning the constructed cube view. A cache management policy (e.g., least recently used, least frequently used, etc.) may be used to determine when a cached cube view is deleted from the cache.

The analytic concept builder 264 may also call into the aggregator 266. When called, the aggregator 266 may determine what cube views, dimensions members, and measures are needed to successfully perform a particular calculation. The aggregator 266 may also calculate results from cube views and return the results to the analytic concept builder 264.

The in-memory data storage 270 may store client data 280 being used during query execution. For example, the client data 280 may be loaded into the in-memory data storage 270 using data connector queries called by the analytic processor 218. The in-memory data storage 270 can be considered a "base" hypercube that includes a large number of available dimensions, where each dimension can include a large number of members. In a particular embodiment, the base cube is an N-dimensional online analytic processing (OLAP) cube.

During operation, the analytics engine 200 may execute queries in response to requests from client instances. For example, a user may log in to a client instance and navigate to a report that illustrates Turnover Rate for a Products organization in Canada during the first quarter of 2011. The client instance may send a query request for a "Turnover Rate" analytic query to be executed using the parameters "Products," "Canada," and "First Quarter, 2011." The server management module 210 may receive the query request and may forward the query request to the analytic processor 218.

Upon receiving the query request, the analytic processor 218 may verify that the user has access to the Turnover Rate query and employee turnover data for the Products organization in Canada. If the user has access, the analytic processor 218 may verify that the employee turnover data is loaded into the in-memory data storage 270. If the employee turnover data is not loaded, the analytic processor 218 may call one or more data connector queries to load the data into the in-memory data storage 270.

When the data is available in the in-memory data storage, the analytic processor 218 may look up the definition of the Turnover Rate query in the repository 220. For example, the definition of the Turnover Rate query may include a rate processing function, an annualization processing function, a sub-query for the number of turnovers during a time period, and a sub-query for average headcount during a time period. The function engine 262 may load the rate and annualization processing functions identified by the query definition.

Once the functions are loaded, the analytic processor 218 may call the analytic concept builder 264 to generate cube views. For example, the analytic concept builder 264 may request the cube manager 268 for cube views corresponding to headcount and turnover count. The cube manager 268 may return the requested cube views from cache or may construct the requested cube views.

The analytic concept builder 264 may execute any required analytic concepts and call into the aggregator 266 to generate result set(s). For the Turnover Rate query, two result sets may be generated in parallel—a result set for average head count and a result set for number of turnover events. For average headcount, the aggregator 266 may call a measure to look into the "Canada" member of the Locations dimension, the "Products" member of the organizations dimension, and "2010-12-31," "2011-01-31," "2011-02-28," and "2011-03-31" of the time dimension to obtain four result values. The four result values may represent the headcount of the Products Organization in Canada on the last day of December 2010, January 2011, February 2011, and March 2011. The aggregator 266 may pass the four values to the analytic concept builder 264. To illustrate, the four values may be 454, 475, 491, and 500.

Similarly, for turnover count, the aggregator 266 may call a measure to look into the "Canada" member of the Locations dimension, the "Products" member of the organizations dimension, and "2011-01," "2011-02," and "2011-03" of the time dimension to obtain a result value. The three result values may represent the total number of turnover events in the Products Organization in Canada during the months of January 2011, February 2011, and March 2011. The aggregator 266 may pass a sum of the result values to the analytic concept builder 264. To illustrate, the sum may be 6.

The analytic concept builder 264 may pass the received values to the analytic processor 218, which may call processing functions to calculate the query result. For example, the analytic processor 218 may call the rate processing function to determine the rate is 1.25% (turnover/average head count=6/480=0.0125). The analytic processor 218 may then call the annualization processing function to determine that the annualized turnover rate is 5% (1.25%*4 quarters=5%). The analytic processor 218 may return the query result of 5% to the client instance via the server management module 210.

It should be noted that the foregoing description, which relates to executing an analytic query to generate a single value, is for example only and not to be considered limiting. Multidimensional queries may also be executed by the analytics engine 200. For example, a user may set his or her application context to "All Organizations" in "Canada" during "2011." The user may then view a distribution chart for Resignation Rate and select groupings by "Age," "Location," and "Gender." To generate the chart, a multidimensional query may be executed by the analytics engine 200. Thus, queries may be executed to retrieve a set of data (e.g., multiple data items), not just a single value.

In a particular embodiment, the analytics engine 200 is configured to perform multidimensional computations on client data 280 and benchmark data (e.g., available at a benchmark server (or application) 282). When a user navigates to an internal benchmarking GUI in an application (e.g., the client instance 112), a request may be sent to the analytics engine 200. In response to the request, client data 280 corresponding to a selected dimension member (e.g., a particular organization, location, etc.) may be loaded into the in-memory data storage 270. Peers, ancestors, and descendants of the particular dimension member may be identified based on the definitions 292 in the content model 290. The security module 258 may identify whether any of the identified peers or ancestors is unavailable to a user (descendants may be assumed as being available). Client data 280 corresponding to available peers, ancestors, and descendants may be loaded into the in-memory data storage 270. The analytic concept builder 264 may call the cube manager 268 to provide multidimensional cube view(s) corresponding to client data 280 loaded in the in-memory data storage 270. The analytic concept builder 264 may also call the aggregator 266 to compute measure values using the cube view(s), as described above. In a particular embodiment, separate cubes are used for the user-selected dimension member and the peers/ancestor/descendant dimension members. Alternately, because the dimensions of the cube/cube views may be common for internal benchmark computations, the same underlying cube structure may be used. The client/benchmark computation results may be returned to the application via the server management module 210.

When a user navigates to an external benchmarking GUI in an application (e.g., the client instance 112), a request may be sent to the analytics engine 200. In response to the request, client data 280 corresponding to a selected dimension member (e.g., a particular organization, location, etc.) may be loaded into the in-memory data storage 270. If requested by the GUI, client data 280 corresponding to available peers, ancestors, and/or descendants may be also loaded into the in-memory data storage 270. The analytic concept builder 264 may call the cube manager 268 to provide a multidimensional cube view(s) corresponding to client data 280 loaded in the in-memory data storage 270. The analytic concept builder 264 may also call the aggregator 266 to compute measure values using the cube view(s), as described above.

To compute benchmark values, the analytic concept builder 264 may call the aggregator 266 with an aggregate measure. Whereas a fact-based measure may be computed by aggregating values on facts from fact tables underlying a cube, an aggregate measure may retrieve a value from an external source (e.g., a query to an external benchmark source). The aggregate measure may indicate that the server 282 (which may be part of a server cluster) stores the external benchmark data. If access to the server 282 is permitted, the analytics engine 200 may construct an application trust token (e.g., the security token 144) that includes a shared key. Each dimension member specified by the request may be translated to corresponding dimension members in the benchmark data using mapping tables (e.g., the mapping tables 135), which may be stored in the repository 220, the client data 280, and/or at the benchmark server 282. A request that includes the translated dimension members may be sent to the server 282 along with the application trust token. The server 282 may validate the trust token and execute the request. The resulting data may be returned to the analytics engine 200, which may retranslate the data to convert benchmark dimension members back to client dimension members. The client/benchmark computation results may be returned to the application via the server management module 210.

FIG. 2 thus illustrates a server-side system to perform multidimensional computations on client data and benchmark data. Results of the computations may be used by a client instance to generate reports and visualizations. In a particular embodiment, computations for benchmark data occur at the same server as computations for client data, as described with reference to FIG. 1. Alternately, computations of benchmark data may occur at a separate server and may be controlled by a separate benchmarking application, as described with reference to FIG. 2.

Figure 3:
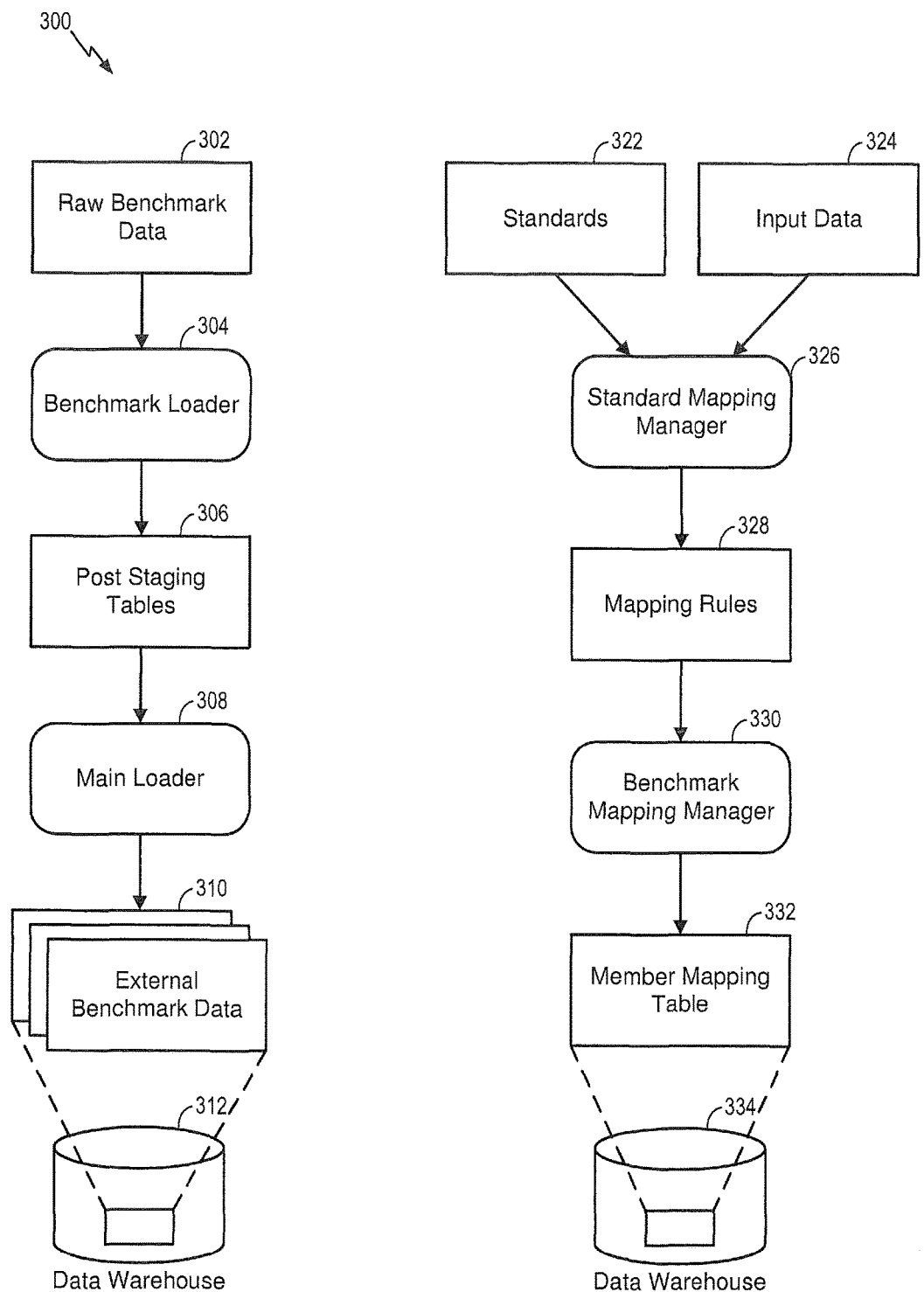
FIG. 3 is a diagram of a particular embodiment of a method of generating benchmark data tables and mapping tables of FIG. 1.

Referring to FIG. 3, a particular embodiment of a method of generating benchmark data tables and mapping tables is shown and generally designated 300. In particular, a process to generate benchmark tables is shown on the left side of FIG. 3 and a process to generate mapping tables is shown on the right side of FIG. 3.

To generate benchmark data tables, a benchmark loader 304 may retrieve "raw" benchmark data 302 from a benchmark data source (e.g., the data source 150 of FIG. 1). The benchmark loader 304 may correspond to hardware and/or software that is configured to convert the raw benchmark data 302 into a post staging format and store the converted data in post staging tables 306. In a particular embodiment, the benchmark loader 304 parses the raw benchmark data 302 and converts the parsed data into a format compatible with a main loader 308. As an illustrative, non-limiting example, the raw benchmark data 302 may be one or more delimited (e.g., comma-separated) text files and the benchmark loader 304 may convert the delimited text files into an extensible markup language (XML) format.

The main loader 308 may correspond to hardware and/or software that is configured to load post staging data into a data warehouse 312. For example, the main loader 308 may use data connector queries to populate external benchmark data tables 310 that are stored in the data warehouse 312. In a particular embodiment, the external benchmark data tables 310 store benchmark data differently than how client (e.g., customer) data is stored. Customer data may store facts about employees or events, which are aggregated into averages and rates during query execution. In contrast, for benchmark data such aggregated averages and rates may be directly stored in the data warehouse 312. Thus, the benchmark data tables 310 may contain tuples that include a combination of several dimension members (e.g., time, location, industry, etc.) and a relevant aggregate value. Embodiments of benchmark data tables are further described with reference to FIG. 4.

To construct mapping tables (e.g., an illustrative member mapping table 332), a standard mapping manager 326 may receive standards data 322 and input data 324, which may include client data and/or benchmark data. The standards data 322 may represent a standardized ontology of dimension members that can be used to automatically generate mappings between client dimensions and benchmark dimensions. For example, a location dimension may be standardized in a hierarchy. Per the standard data 322, location dimension member "US" may include each of the fifty states. The state "Texas" may include the members "Houston," "Dallas," "Austin," etc. Client (e.g., customer) data may include the location dimension member "HOUSTON," which is mapped by the standard mapping manager 326 to "Houston" in the standardized hierarchy. In contrast, benchmark data may have state classifications but not city classifications. Therefore, a "TX" member in the benchmark data may be mapped to "Texas" in the standardized hierarchy. Because the hierarchy indicates that "Houston" is a child of "Texas," the "HOUSTON" in the client data is mapped to the "TX" in the benchmark data in mapping rules 328. Further, if the benchmark data changes, the change can be accommodated by altering the mapping from the benchmark to the standard in the mapping rules 328, instead of altering the mapping from the benchmark to every client data set.

A benchmark mapping manager 330 may convert the mapping rules 328 into the member mapping table(s) 332 that is stored in a data warehouse 334. The data warehouse 334 may be the same as the data warehouse 312 or may be a different (e.g., remotely located) data warehouse. The member mapping table(s) 332 may be used by a server (e.g., the analytics engine 130 of FIG. 1, the benchmark data source 150 of FIG. 1, the analytics engine 200 of FIG. 2, and/or the benchmark server 282 of FIG. 2) when executing queries on external benchmark data.

Figure 4:
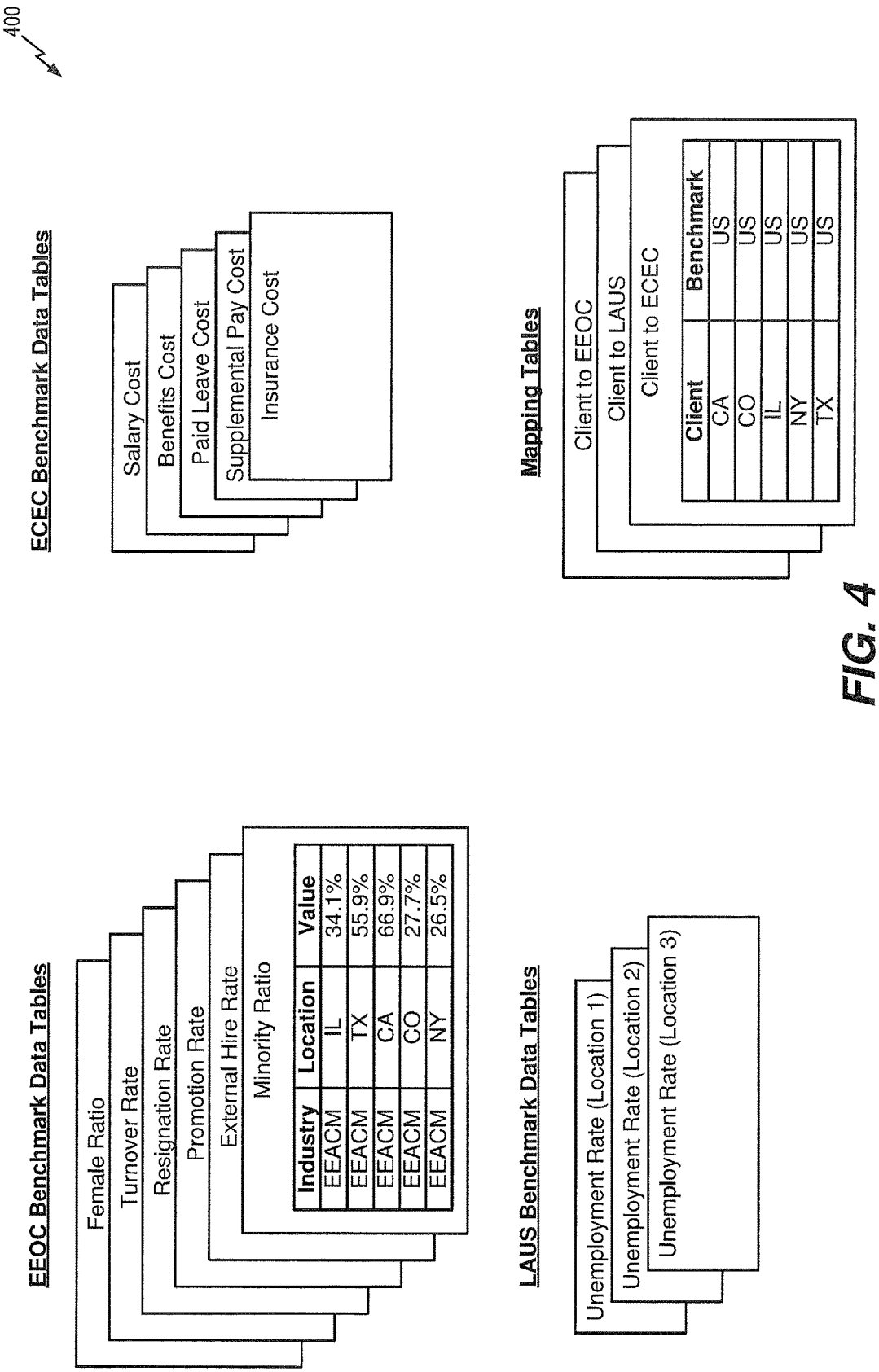
FIG. 4 illustrates particular embodiments of the benchmark data tables and the mapping tables of FIG. 1.

Referring to FIG. 4, illustrative embodiments of benchmark data tables and mapping tables are shown and generally designated 400. As shown in FIG. 4, benchmark data tables may be populated using data from various benchmarking sources, such as EEOC, ECEC, and LAUS. In the illustrated embodiment, EEOC tables are maintained for a female ratio, a turnover rate, a resignation rate, a promotion rate, an external hire rate, and a minority ratio. ECEC tables are maintained for a salary cost, a benefits cost, a paid leave cost, a supplemental pay cost, and an insurance cost. LAUS tables are maintained for unemployment rates in multiple locations.

Further, as shown in FIG. 4, mapping tables may be maintained to map client dimension members to benchmark dimension members, and vice versa. In the illustrated embodiment, mapping tables are maintained for mapping client members to EEOC members, LAUS members, and ECEC members, respectively.

It should be noted that although tables corresponding to different measures and benchmark data sources are illustrated as being separate, in alternate embodiments certain tables may be combined and/or subdivided. Further, the illustrated measures and benchmark data sources are for example only and are not to be considered limiting. Additional, fewer, and/or different measure and benchmark data sources may be used in alternative embodiments.

Figure 5:
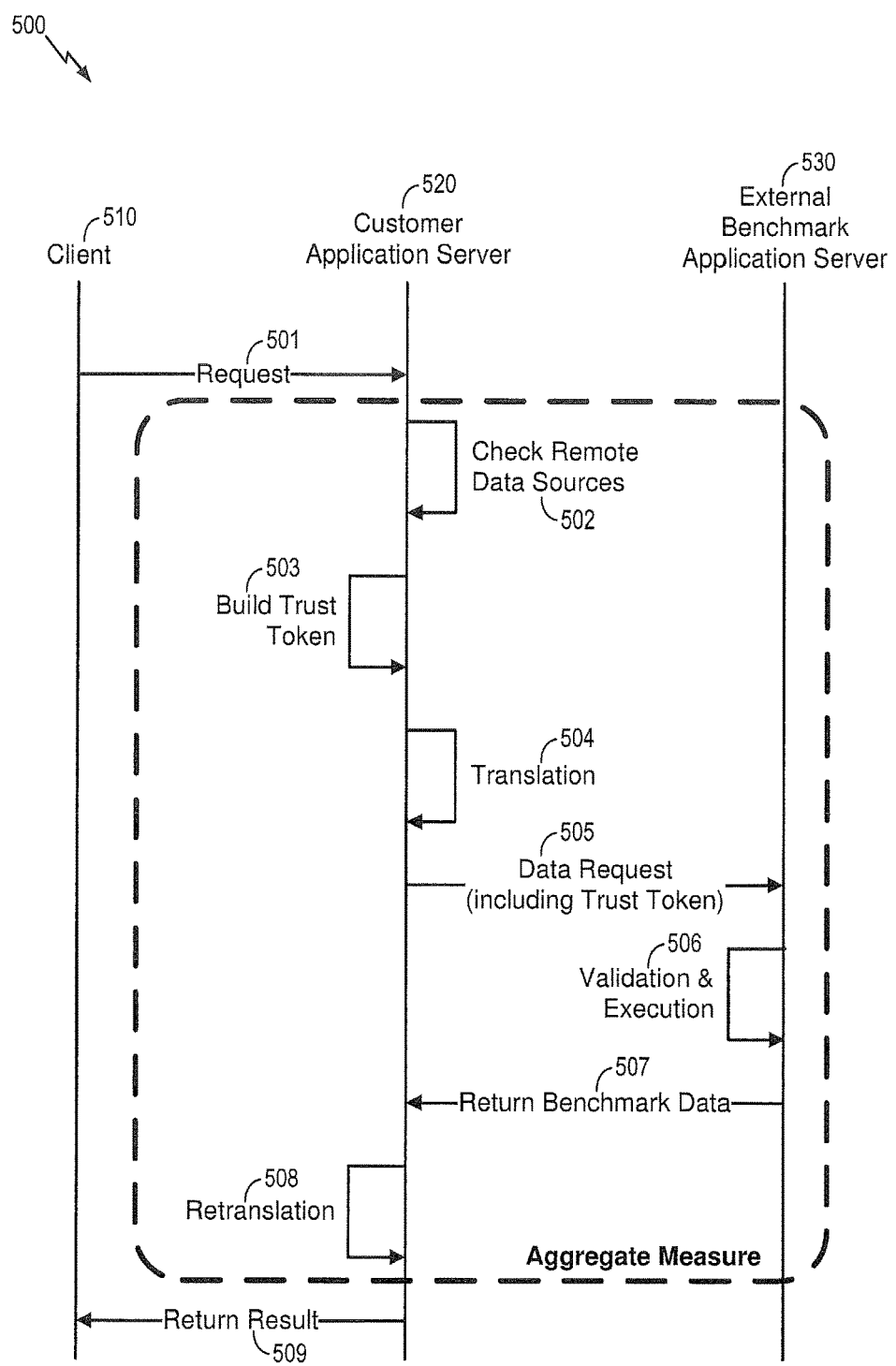
FIG. 5 is a ladder diagram of a particular embodiment of client-server messaging associated with executing an aggregate measure based on benchmark data.

Referring to FIG. 5, a ladder diagram illustrating a particular embodiment of messaging associated with executing an aggregate measure on external benchmark data is shown and generally designated 500. During execution of the aggregate measure, communication may occur between a client 510 (e.g., the client instance 112), a customer application server 520 (e.g., the analytics engine 130 or the analytics engine 200), and an external benchmark application server 530 (e.g., the benchmark data source 150 or the benchmark server 282).

To initiate the execution of the aggregate measure, the client may send a request to the customer application server 520, as shown at 501. For example, the request may correspond to the query 142 and may be generated when a particular user 114 navigates to an external benchmark visualization using a particular client instance 112.

The customer application server 520 may check, at 502, whether the remote data sources needed to execute the aggregate measure are available. If so, the customer application builds a trust token, at 503. The query is subjected to a translation process, at 504, where each (client data) member is looked up in a member mappings table and converted into an external benchmark member.

At 505, the customer application server 520 sends a data request to the external benchmark application server 530. The data request may include the application trust token and the translated query. Continuing to 506, the external benchmark application server 530 may validate the application trust token. For example, the external benchmark application server 530 may verify that a shared key included in the application trust token matches an internal shared key maintained by the external benchmark application server 530. If the application trust token is valid, the benchmark application server 530 may execute the translated query by aggregating across the aggregate values (e.g., averages and rates) stored in the external benchmark tables.

The external benchmark application server 530 may return benchmark data corresponding to the query execution results, at 507, and the customer application server 520 may re-translate (e.g., reverse translation of) the benchmark data from the benchmark dimensions to the client dimensions, at 508. The resulting data may be returned to the client 510, as shown at 509. In some embodiments, benchmark value(s) may be computed based on a model, as described with reference to FIG. 1. For example, a benchmark value for "Software Developer" salary ranges may be available in benchmark data. A model may be used to generate salary ranges for "Software Tester" in each of the industries, locations, etc. for which a "Software Developer" value is available. To illustrate, the model may indicate that "Software Tester" salaries are expected to be a particular percentage of "Software Developer" salaries. As another example, if benchmark values for a current year are missing from benchmark data, the missing values may be determined based on a forecasting model. For example, in the case of monetary values, the forecasting model may include forecasted rates of inflation in different locations.

If external benchmark data does not include an entire dimension that is included in client data, the dimension may be ignored for the external benchmark data. To illustrate, a "Performance Group" dimension in client data may indicate whether employees are classified as "High Performers," "Medium Performers," "Low Performers," etc. However, external benchmark data may not include a performance group dimension. If a user is viewing a chart that illustrates a measure distributed across performance group, the external benchmark data may not be distributed across performance group. Instead, a line or bar may be drawn on the chart representing an overall value of the measure. Further, in some scenarios, a dimension member may not have an exact match in benchmark data. Such scenarios are described with reference to FIG. 7.

Further, if a user performs a filtering operation based on a dimension that is missing from the external benchmark data, the external benchmark data may not be filtered by the dimension. For example, if the user is viewing a chart that compares a client value of a measure to a benchmark value of the measure and filters by "Performance Group—High Performers," the client data is may be filtered to only show data of employees in the "High Performers" group and the client result value may be updated to correspond to the "High Performers" employees. In contrast, external benchmark data may remain unfiltered and the benchmark result value may remain unchanged.

FIGS. 3-5 thus illustrate embodiments of populating and using external benchmark tables to compute values of a measure relative to an external benchmark. Further, the described techniques may handle situations such as missing mappings or inability to filter without generating an error message, which may improve user experience.

Figure 6:
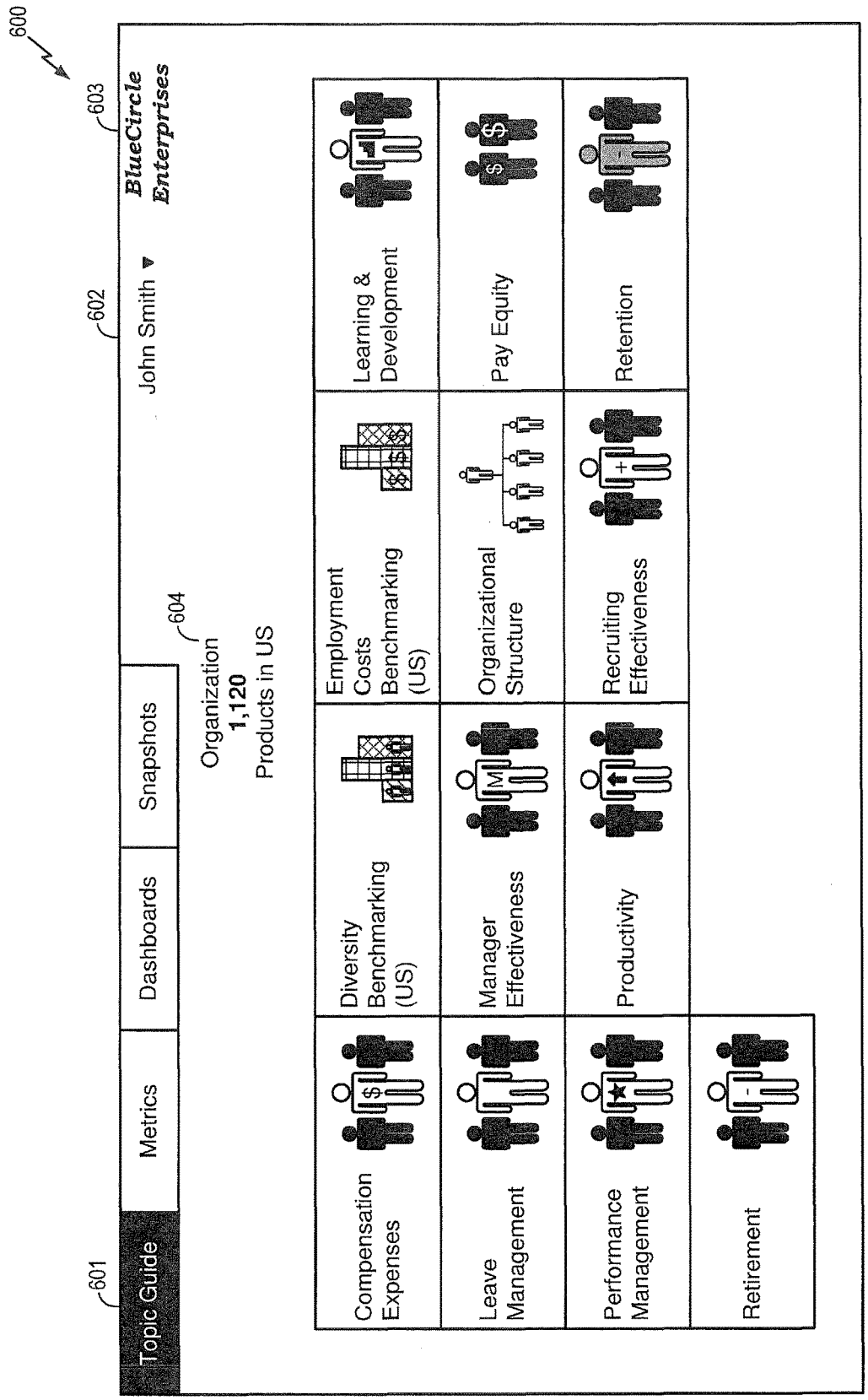
FIG. 6 illustrates a first particular embodiment of a graphical user interface (GUI) to compare client data and benchmark data.

FIG. 6 illustrates a graphical user interface GUI 600 generated by an application. In an illustrative embodiment, the GUI 600 is generated by one of the client instances 112 of FIG. 1.

In the GUI 600, a topic guide tab 601 is selected. The topic guide may present a high-level list of semantic items (e.g., business topics) that are available for the user John Smith (as indicated at 602), who is an employee of the company BlueCircle Enterprises (as indicated at 603). The GUI 600 also indicates an application context 604. In the illustrated example, the application context is the "Products" organization of BlueCircle Enterprises in the "US" location. The application context 604 corresponds to a population of 1,120 employees. As the user (John Smith) changes the application context (e.g., changes the "Location" dimension from "US" to "All Locations," changes the "Organization" dimension from "Products" to "Legal," etc.), the population may be dynamically updated. The application context 604 may represent a filter or set of filters that is used during query execution.

In FIG. 6, the topic guide includes topics for compensation expenses, diversity benchmarking, employment costs benchmarking, learning and development, leave management, manager effectiveness, organizational structure, pay equity, performance management, productivity, recruiting effectiveness, retention, and retirement. One or more of the topics may be selected to view visualizations (e.g., charts and graphs) that compare client data to internal and/or external benchmark data. For example, the diversity benchmark topic may be selected to view visualizations related to minority ratio, female ratio, etc. As another example, the employment costs benchmarking topic may be selected to view visualizations related to salary cost, benefits cost, etc. As yet another example, the recruiting effectiveness topic may be selected to view visualizations related to time to fill.

Figure 7:
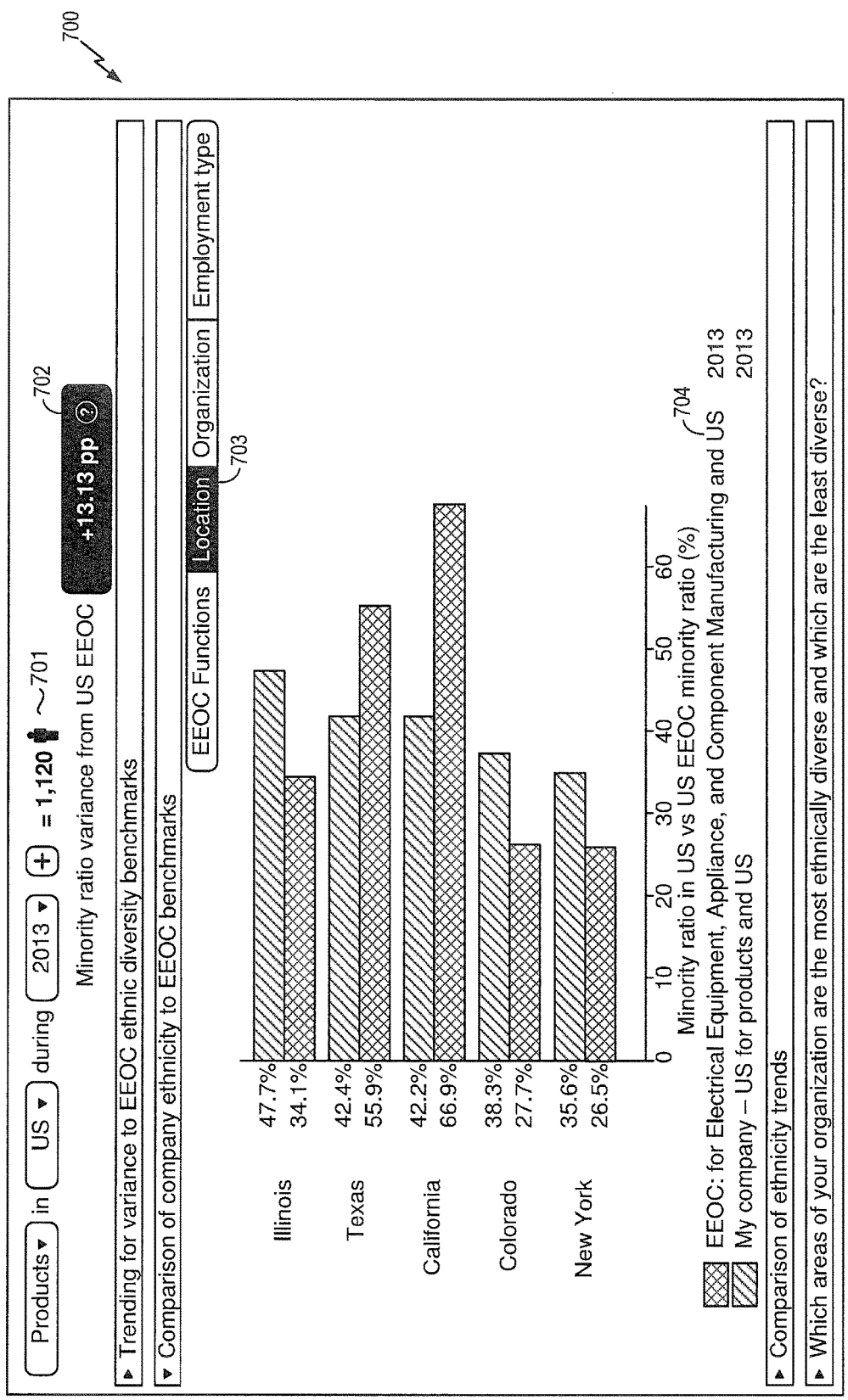
FIG. 7 illustrates a second particular embodiment of a GUI to compare client data and benchmark data.

FIG. 7 depicts a particular embodiment of a GUI 700 that corresponds to an external benchmarking concept "Minority ratio variance from US EEOC." Business topics/questions for this concept include "Trending for variance to EEOC ethnic diversity benchmarks," "Comparison of company ethnicity to EEOC benchmarks," "Comparison of Ethnicity trends," and "Which areas of your organization are the most ethnically diverse and which are the least diverse?"

A user has selected the "Products" organization, the "US" location, and the date range "2013" for the application context, as shown at 701. The GUI 700 illustrates that for the population identified by the application context, the overall minority ratio variance from the comparable US EEOC benchmark is +13.13 percentage points (pp), as shown at 702.

In the example of FIG. 7, the "Comparison of company ethnicity to EEOC benchmarks" topic is expanded to show a bar chart visualization. The bar chart visualization includes options to compare minority ratio to the US EEOC benchmark across EEOC functions, location, organization, and employment type. In FIG. 7, a location option 703 is selected. Thus, the bar chart visualization illustrates, for each state that the "Products" organization has employees, a comparison of the minority ratio of the "Products" organization in that state to the US EEOC minority ratio benchmark for that state. To illustrate, for Illinois, the "Products" organization has a minority ratio of 47.7% and the US EEOC-determined average minority ratio is 34.1%. The various client result values and benchmark result values shown in FIG. 7 may be computed in accordance with the operations described with reference to FIGS. 1-5. In the illustrated embodiment, the US EEOC benchmark data includes data for multiple industries. BlueCircle Enterprises has been mapped to the Electrical Equipment, Appliance, and Component Manufacturing (EEACM) industry, as shown at 704.

It should be noted that occasionally, an exact member mapping from client data to external benchmark data may not be available. If a dimension member on an axis of a chart (e.g., a bar of a bar chart) does not have an exact mapping, the dimension member may be mapped to a member higher up the standards hierarchy described with reference to FIG. 4. For example "Seattle" may be mapped to "Washington." For application context filters indicated at 701 (also referred to as "global context filters"), an analytics engine may attempt to find a population for which benchmark values exist. If no direct mapping exists, the analytics engine may attempt to map the dimension member to as many lower-level (child) dimension members in the hierarchy as possible. To illustrate, if a user selects "North America" as a global context filter and benchmark data is only available for "US," then the analytics engine may map "North America" downwards in the hierarchy to "US." This member mapping may be indicated in the legend shown at 704. As another example, if a user selects "South America" as a global context filter and benchmark data is only available for "Brazil," "Columbia," and "Argentina," then the analytics engine may map "South America" to the combination (e.g., logical union) of "Brazil," "Columbia," and "Argentina."

Figure 8:
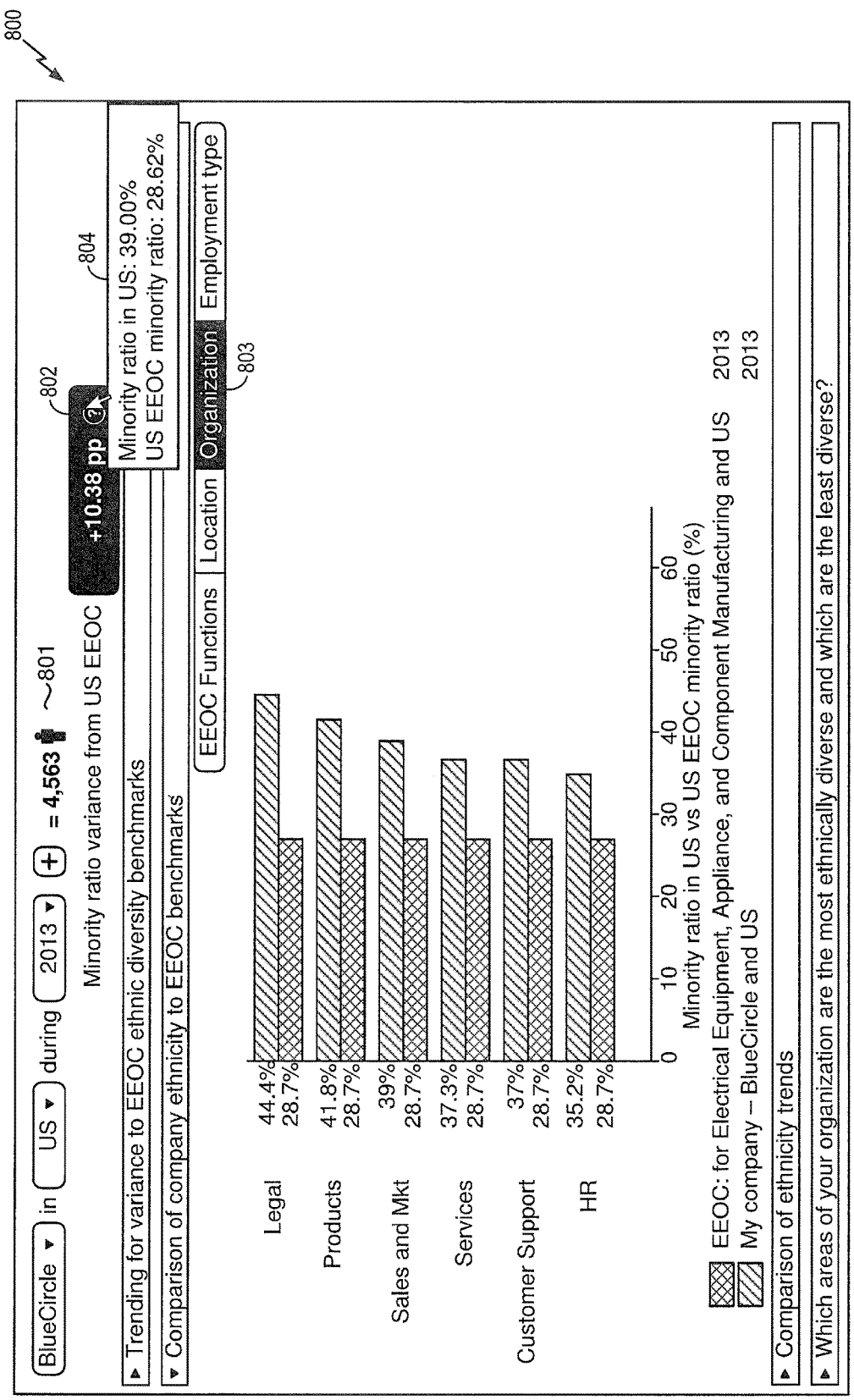
FIG. 8 illustrates a third particular embodiment of a GUI to compare client data and benchmark data.

FIG. 8 illustrates a GUI 800 that also corresponds to the concept "Minority ratio variance from US EEOC." However, in contrast to FIG. 7, for the GUI 800, the user has selected the root-level ancestor organization "BlueCircle" instead of the "Products" organization, as shown at 801. Further, the user has selected to view the client and benchmark result values across organizations instead of across locations, as shown at 803. Thus, the bar chart visualization illustrates, for each organization of BlueCircle Enterprises, a comparison of the minority ratio in that organization to an EEOC-determined average minority ratio. In the illustrated example, the EEOC benchmark data does not have an "Organization" dimension. Thus, each of the organizational dimension members (e.g., "Legal," "Products," etc.) is compared to the average EEOC-determined minority ratio for the entire US, which is 28.7%. The GUI 800 also illustrates that for the population identified by the application context (i.e., all US employees of BlueCircle Enterprises), the overall minority ratio variance from the comparable US EEOC benchmark is +10.38 percentage points (pp), as shown at 802. The user can view underlying data for the overall minority ratio by selecting (e.g., hovering a mouse pointer over) the question mark. In the illustrated example, the +10.38 pp is indicated as being derived from a minority ratio of 39.00% for BlueCircle Enterprises in the US and an EEOC-determined nationwide average minority ratio of 28.62%.

Figure 9:
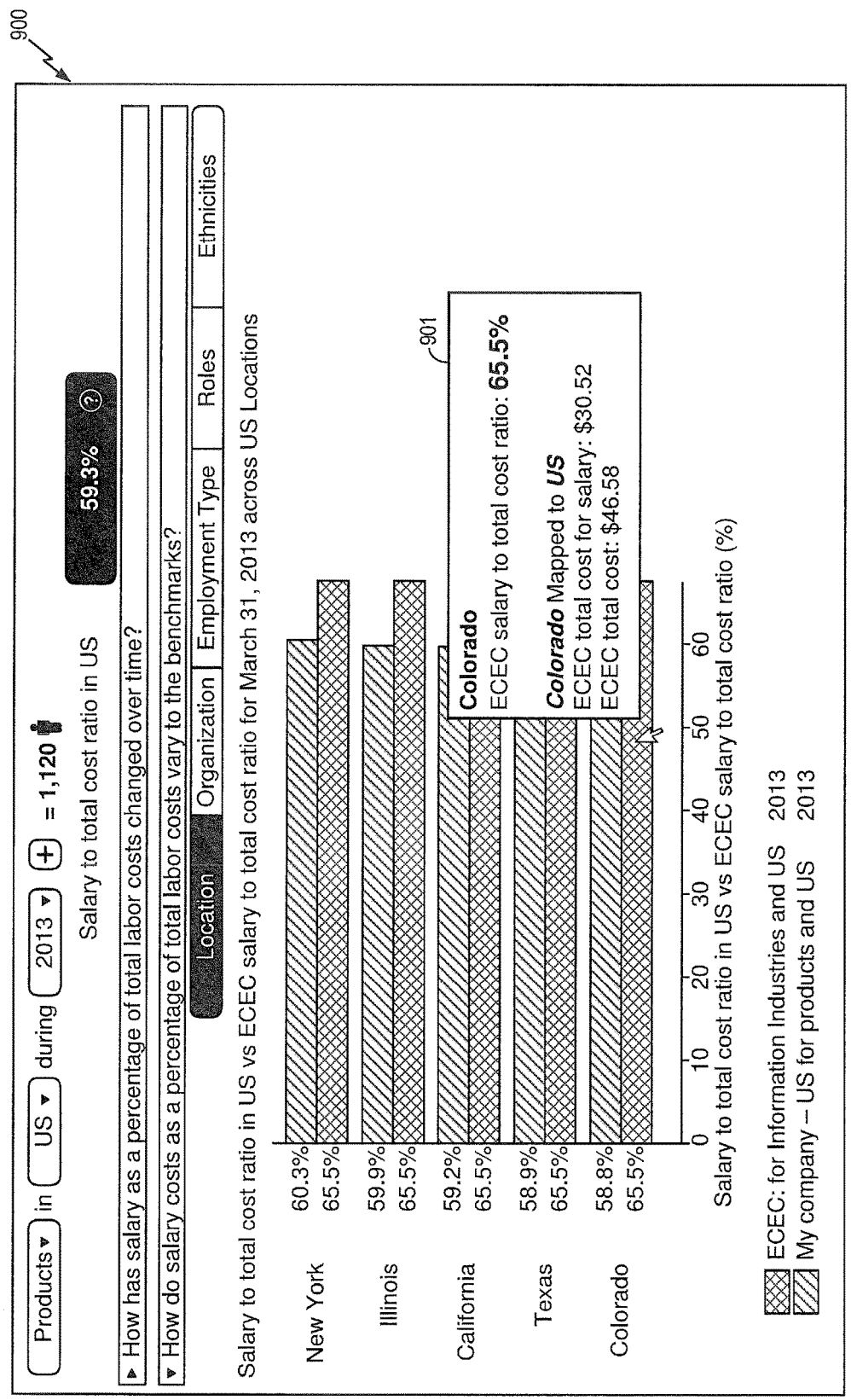
FIG. 9 illustrates a fourth particular embodiment of a GUI to compare client data and benchmark data.

FIG. 9 illustrates a GUI 900 that corresponds to the external benchmarking concept "Salary to total cost ratio in US." In FIG. 9, the user is viewing a visualization that compares client and ECEC values for the measure "Salary to total cost ratio" in the "Products" organization across locations (e.g., US states). The GUI 900 illustrates that for the population identified by the application context, the overall salary to cost ratio is 59.3%. In FIG. 9, the ECEC-determined average salary to total cost ratio for each of the states is indicated to be the same: 65.5%. This is because each of the states is mapped to the same "US" dimension member in the benchmark data. The user can view such mapping information by selecting (e.g., hovering a mouse pointer over) any of the ECEC-bars. In the illustrated example, mapping information for Colorado is shown, indicating that "Colorado" in client data is mapped to "US" in benchmark data. The underlying ECEC data for salary cost and total cost are also shown.

Figure 10:
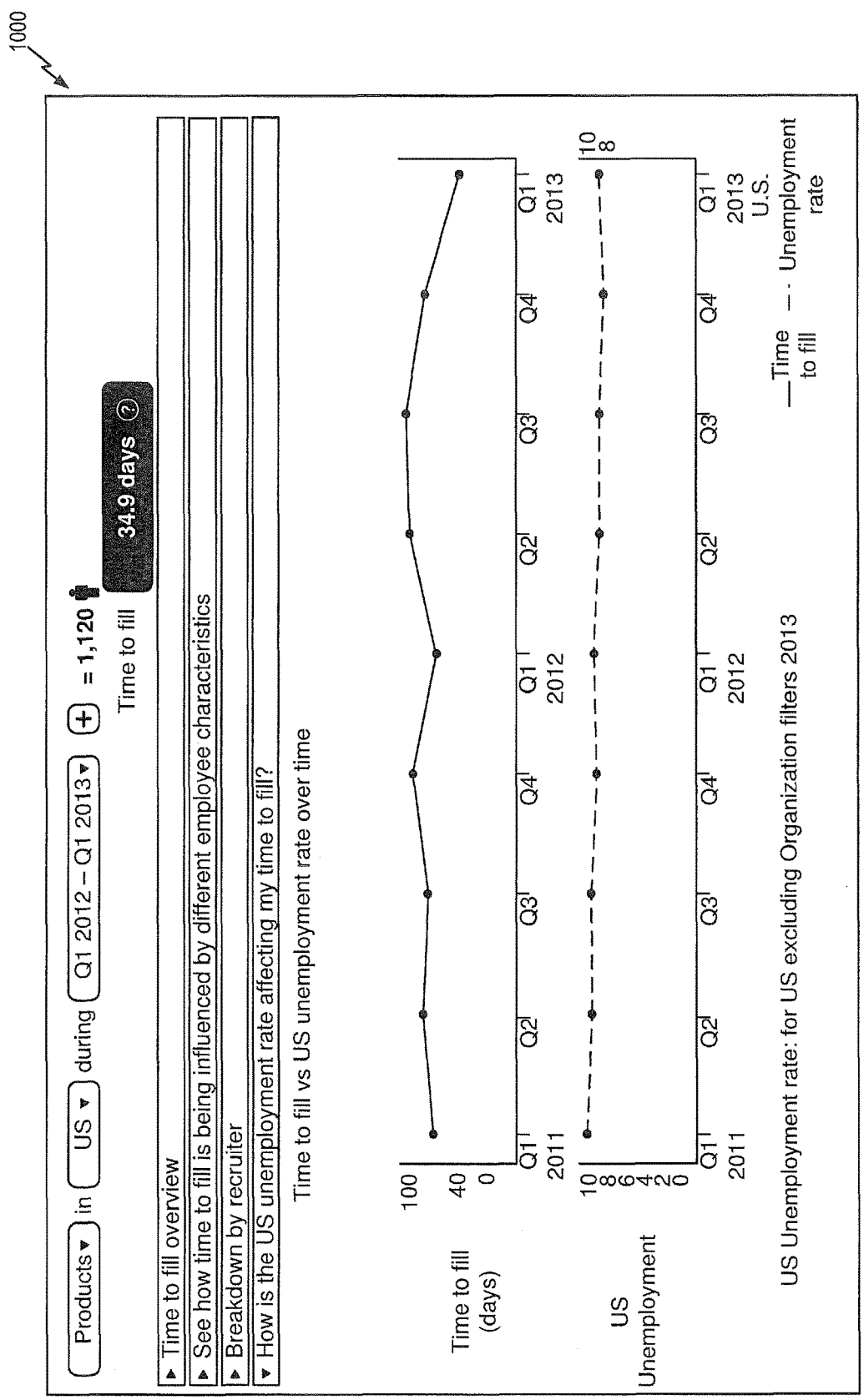
FIG. 10 illustrates a fifth particular embodiment of a GUI to compare client data and benchmark data.

FIG. 10 illustrates a GUI 1000 that corresponds to the external benchmarking concept "Time to fill." In FIG. 10, the user is viewing a visualization that compares the time to fill in the "Products" organization across the US to the US unemployment rate. If the user had selected a more specific location of "California" instead of "US" in the application context, the client time to fill data would be specific to the "California" client dimension member. The benchmark unemployment data would also be specific to California, if available. The GUI 1000 illustrates that for the population identified by the application context, the overall time to fill is 34.9 days. In contrast to the preceding screenshots, for the GUI 1000, the user has selected the time period of Q1 (first quarter) 2012 to Q1 2013 instead of "2013." Based on this selection, the time to fill and US unemployment data is shown quarter-by-quarter.

Figure 11:
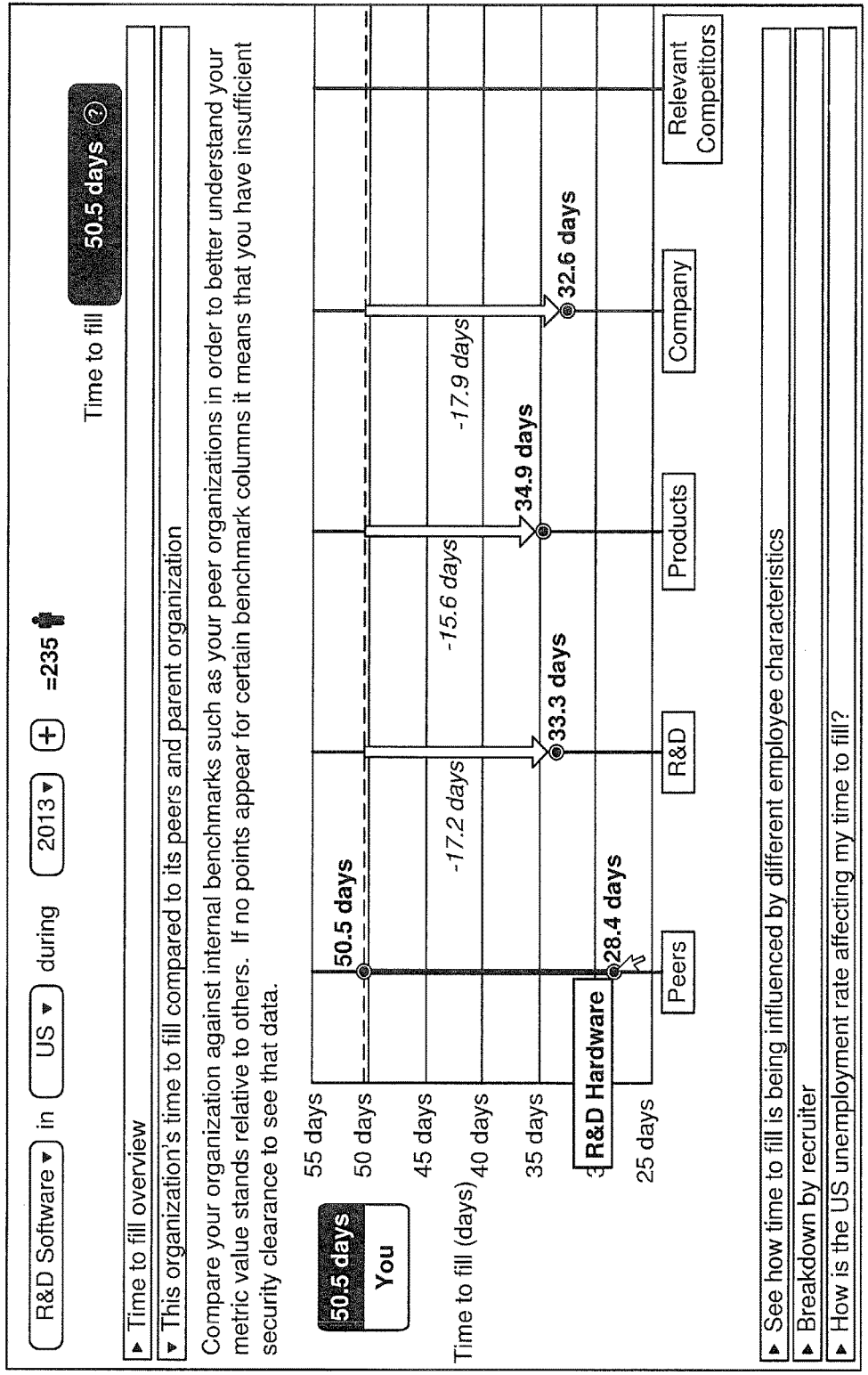
FIG. 11 illustrates a sixth particular embodiment of a GUI to compare client data and benchmark data.

FIG. 11 illustrates another GUI 1100 corresponding to the "Time to fill" concept. Unlike the GUI 1000 of FIG. 10, the GUI 1100 of FIG. 11 is computed based on internal benchmarks. For the GUI 1100, the user has selected the "R&D Software" organization for the application context. Thus, the GUI 1100 illustrates the overall time to fill for the "R&D Software," which is 50.5 days. The GUI 1100 also includes the time to fill for peer organization(s) and ancestor/descendant organization(s). For example, the GUI 1100 illustrates that the time to fill for the peer "R&D Hardware" organization is 28.4 days, and the time to fill for the parent "R&D" organization is 33.3 days. The GUI 1100 also illustrates that the time to fill for the grandparent "Products" organization is 34.9 days (as also shown in FIG. 10). The GUI 1100 further illustrates that the time to fill for the root-level ancestor organization, i.e., the "Company" is 32.6 days. Although not shown in FIG. 11, if a user and/or administrator have defined "Relevant Comparators" for the "R&D Software" organization, the time to fill for such comparators would also be illustrated. The "Relevant Comparators" may thus represent, for a particular dimension member, comparator dimension members that are selected by a user and/or an administrator and that are available for comparison.

Figure 12:
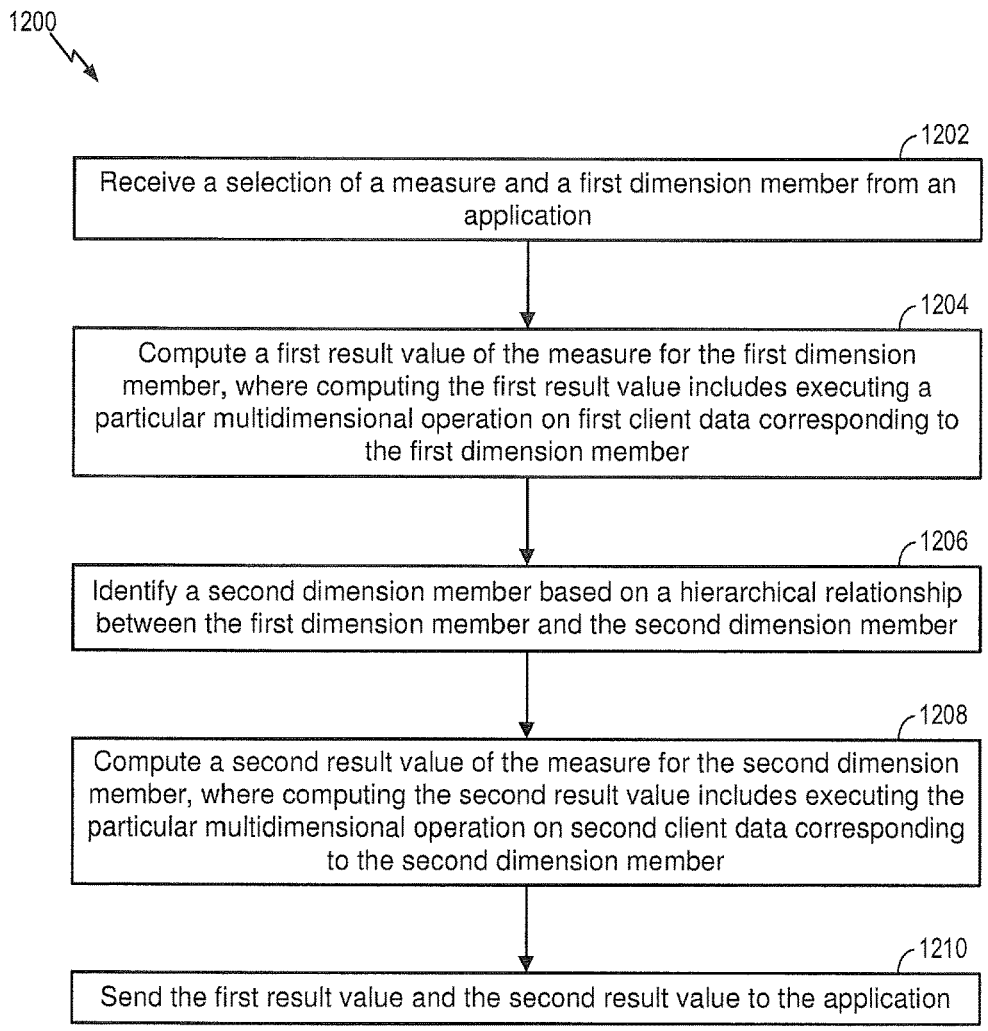
FIG. 12 is a flowchart of a particular embodiment of a method of performing multidimensional comparison of client and internal benchmark data.

Referring to FIG. 12, a flowchart illustrates a particular embodiment of a method 1200 of performing a comparison of client data to internal benchmark data. In an illustrative embodiment, the method 1200 may be performed by the analytics engine 130 of FIG. 1 or the analytics engine 200 of FIG. 2.

The method 1200 includes receiving a selection of a measure and a first dimension member from an application, at 1202. For example, referring to FIG. 1, the analytics engine 130 may receive the query 142 from the client instance 112, where the query indicates a measure and a first dimension member selected by the user 114. To illustrate, for operations corresponding to the GUI 1100 of FIG. 11, the selected measure is "Time to fill" and the selected first dimension member is "R&D Software."

The method 1200 also includes computing a first result value of the measure for the first dimension member, at 1204. Computing the first result value may include executing a particular multidimensional operation on first client data corresponding to the first dimension member. To illustrate, for operations corresponding to the GUI 1100 of FIG. 11, the first result value for the "R&D Software" dimension member is a time to fill of 50.5 days.

The method 1200 further includes identifying a second dimension member based on a hierarchical relationship between the first dimension member and the second dimension member, at 1206. To illustrate, for operations corresponding to the GUI 1100 of FIG. 11, the ancestor dimension member "R&D" may be identified.

The method 1200 includes computing a second result value of the measure for the second dimension member, at 1208. Computing the second result value may include executing the same multidimensional operation on second client data corresponding to the second dimension member. To illustrate, for operations corresponding to the GUI 1100 of FIG. 11, the second result value for the "R&D" dimension member is 33.3 days.

The method 1200 also includes sending the first result value and the second result value to the application, at 1210. For example, the analytics engine 130 of FIG. 1 may send the query results 148 to the client instance 112, which may use the query results 148 to generate a GUI, such as the GUI 1100 of FIG. 11. The method 1200 of FIG. 12 may enable an analytics engine to compute the value of a measure for a user-selected dimension member and for automatically identified peer, ancestor, and/or descendant dimension members.

Figure 13:
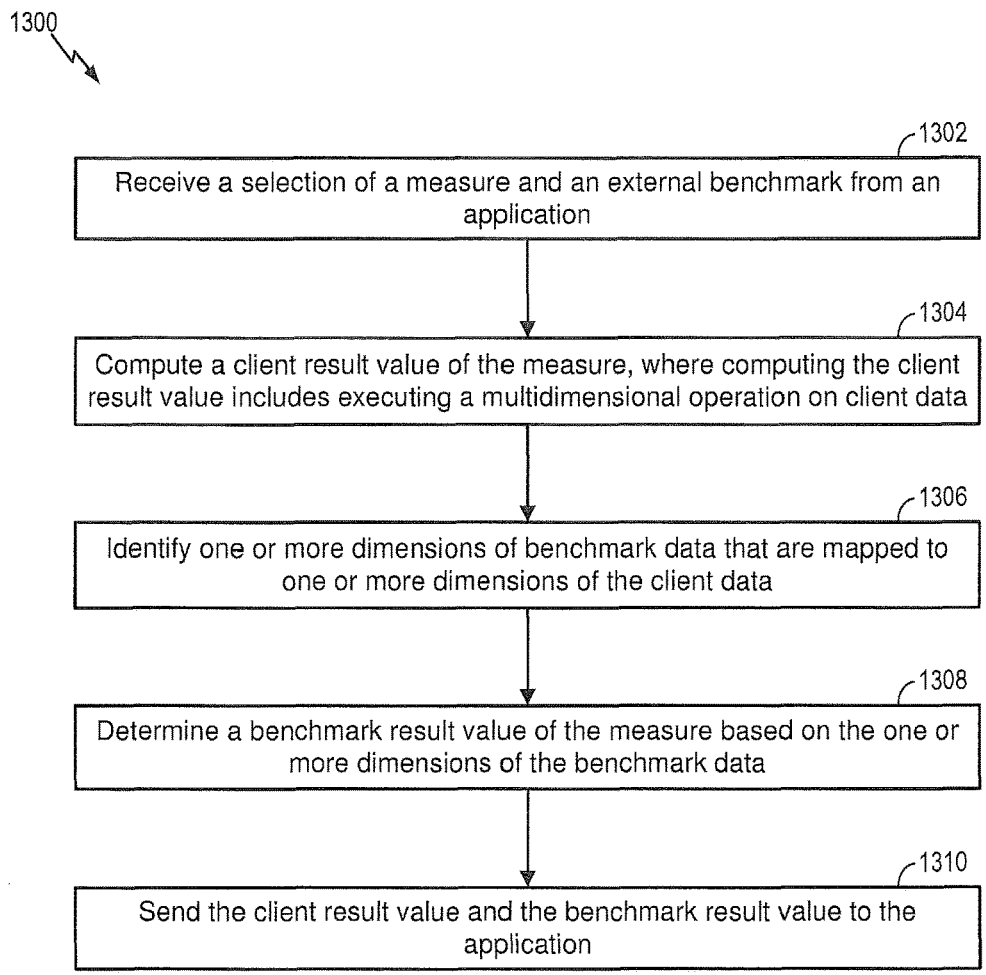
FIG. 13 is a flowchart of a particular embodiment of a method of performing multidimensional comparison of client and external benchmark data.

Referring to FIG. 13, a flowchart illustrates a particular embodiment of a method 1300 of performing a comparison of client data to external benchmark data. In an illustrative embodiment, the method 1300, or a portion thereof, may be performed by the analytics engine 130 of FIG. 1, the analytics engine 200 of FIG. 2, the system of FIG. 3, in accordance with the messaging of FIG. 5, or a combination thereof.

The method 1300 includes receiving a selection of a measure and an external benchmark from an application, at 1302. For example, referring to FIG. 1, the analytics engine 130 may receive the query 142 from the client instance 112, where the query indicates a measure and an external benchmark selected by the user 114. To illustrate, for operations corresponding to the GUI 700 of FIG. 1, the selected measure is "Minority ratio variance" and the selected benchmark is US EEOC-determined average minority ratio.

The method 1300 also includes computing a client result value of the measure, at 1304. Computing the client result value may include executing a multidimensional operation on client data. To illustrate, for operations corresponding to the GUI 700 of FIG. 7, the client result value for the dimension members "Products" and "Texas" is 42.4%.

The method 1300 further includes identifying one or more dimensions of benchmark data that are mapped to one or more dimensions of the client data, at 1306. To illustrate, for operations corresponding to the GUI 700 of FIG. 7, a dimension member "TX" in EEOC benchmark data may be identified as being mapped to the dimension member "Texas" in the client data.

The method 1300 includes determining a benchmark result value of the measure based on the one or more dimensions of the benchmark data, at 1308. To illustrate, for operations corresponding to the GUI 700 of FIG. 7, the benchmark result value for Texas is 55.9%. In an illustrative embodiment, the benchmark result value is determined based on the process described with reference to FIG. 5. The method 1300 also includes sending the client result value and the benchmark result value to the application, at 1310. For example, the analytics engine 130 of FIG. 1 may send the query results 148 to the client instance 112, which may use the query results 148 to generate a GUI, such as the GUI 700 of FIG. 7. The method 1300 of FIG. 13 may enable an analytics engine to compute comparative values of a measure based on client data and based on benchmark data provided by an external benchmark source.

Figure 14:
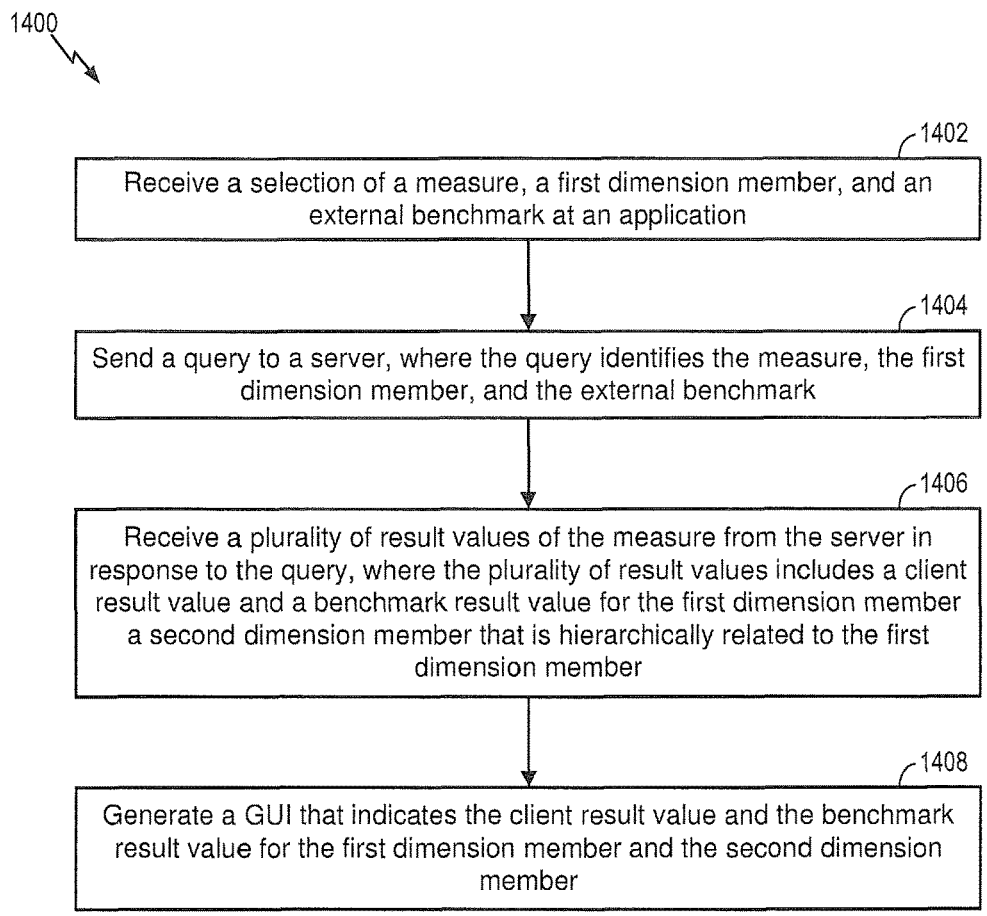
FIG. 14 is a flowchart of a particular embodiment of a method of generating a GUI to compare client and benchmark data.

Referring to FIG. 14, a flowchart illustrates a particular embodiment of a method 1400 of generating a GUI that compares client data to benchmark data.

The method 1400 includes receiving a selection of a measure, a first dimension member, and an external benchmark at an application, at 1402. For example, referring to FIG. 1, the client instance 112 may receive a selection of a measure, a first dimension member, and an external benchmark from the user 114. To illustrate, for operations corresponding to the GUI 800 of FIG. 8, the measure is "Minority ratio variance," the benchmark is US EEOC-determined average minority ratio, and the first dimension member is the "BlueCircle" organization.

The method 1400 also includes sending a query to a server, at 1404. The query identifies the measure, the first dimension member, and the external benchmark. For example, referring to FIG. 1, the client instance 112 may send the query 142 to the analytics engine 130.

The method 1400 further includes receiving a plurality of result values of the measure from the server in response to the query, at 1406. The plurality of result values includes a client result value and a benchmark result value for the first dimension member a second dimension member that is hierarchically related to the first dimension member. For example, for operations corresponding to the GUI 800, the client result value and benchmark result value for the "BlueCircle" organization are 39.00% and 28.62%, respectively. Client result values for the "Products" organization, which is a hierarchical descendant of the "BlueCircle" organization, are 41.8% and 28.7%, respectively.

The method 1400 includes generating a GUI that indicates the client result value and the benchmark result value for the first dimension member and the second dimension member, at 1408. For example, the client instance 112 of FIG. 1 may receive the query results 148 from the analytics engine 130 and may use the query results 148 to generate a GUI, such as the GUI 800 of FIG. 8. The method 1400 of FIG. 14 may enable a client application to display visualizations that enable a user to compare the performance of an organization to other organizations and/or to external benchmarks.

In accordance with various embodiments of the present disclosure, the methods, functions, and modules described herein may be implemented by software programs executable by a computer system. Further, in an exemplary embodiment, implementations can include distributed processing, component/object distributed processing, and parallel processing. Alternatively, virtual computer system processing can be used to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, a set-top box, a media player, or any combination thereof. The computer system may be connected, e.g., using a network, to other computer systems or peripheral devices. For example, the computer system or components thereof can include or be included within any one or more of the devices, systems, modules, and/or components illustrated in or described with reference to FIGS. 1-14. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage device. A computer-readable or processor-readable device is not a signal.

In a particular embodiment, a method includes receiving, at a server, a selection of a measure and a first dimension member from an application executed by a computing device. The method also includes computing a first result value of the measure for the first dimension member. Computing the first result value includes executing a particular multidimensional operation on first client data corresponding to the first dimension member. The method further includes identifying a second dimension member based on a relationship between the first dimension member and the second dimension member and computing a second result value of the measure for the second dimension member. Computing the second result value includes executing the particular multidimensional operation on second client data corresponding to the second dimension member. The method includes sending the first result value and the second result value to the application.

In another particular embodiment, a computer-readable storage device stores instructions that, when executed by a computer, cause the computer to perform operations including receiving a selection of a measure and an external benchmark from an application. The operations also include computing a client result value of the measure, where computing the client result value comprises executing a multidimensional operation on client data. The operations further include identifying dimensions of benchmark data that are mapped to dimensions of the client data and determining a benchmark result value of the measure based on the identified dimensions of the benchmark data. The operations include sending the client result value and the benchmark result value to the application.

In another particular embodiment, an apparatus includes a processor and a memory storing instructions that, when executed by the processor, cause the processor to perform operations including receiving a selection of a measure, a first dimension member, and an external benchmark. The operations also include sending a query to a server, where the query identifies the measure, the first dimension member, and the external benchmark. The operations include receiving a plurality of result values from the server in response to the query. The plurality of result values includes a client result value and a benchmark result value for the first dimension member and for a second dimension member. The operations further include generating a GUI that indicates the client result value and the benchmark result value for the first dimension member and the second dimension member.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
generating, by a server, a mapping table, wherein the mapping table maps dimensions and dimension members of client data to dimensions and dimension members of benchmark data, wherein the dimensions of the client data include a first set of dimensions, wherein the dimensions of the benchmark data include a second set of dimensions, and wherein the first set is different from the second set;
receiving, by the server, a query that corresponds to a plurality of values corresponding to the client data, wherein a first storage location stores a first subset of the client data that corresponds to a first set of the plurality of values and a second storage location stores a second subset of the client data that corresponds to a second set of the plurality of values, wherein the first storage location is different from the second storage location, wherein the query identifies a selection of a measure, a first dimension member of the client data, and an external benchmark from an application executed by a computing device, wherein the first dimension member is associated with a first dimension level of a plurality of hierarchically arranged dimension levels in an ontology;
determining, by the server after receiving the query, that the first subset of the client data corresponds to the first set of the plurality of values and the second subset of the client data corresponds to the second set of the plurality of values;
responsive to receiving the query, dividing the query into a plurality of data requests, the plurality of data requests including a first request with respect to the first subset and a second request with respect to the second subset;
computing, by the server, a result value of the measure for the first dimension member based on a combination of a plurality of responses to the plurality of data requests, wherein computing the result value comprises executing a multidimensional operation on the client data corresponding to the first dimension member;
upon determining that the benchmark data associated with the external benchmark does not include a dimension member that matches the first dimension member in the first dimension level:
automatically identifying, by the server, a plurality of dimension members of the benchmark data based on the mapping table, wherein each of the plurality of dimension members is a hierarchical descendant of the first dimension member in the ontology; and
computing, by the server, a benchmark result value of the measure based on each of the plurality of dimension members using one or more models that relate the first dimension member to the plurality of dimension members; and
sending the result value and the benchmark result value to the application.

2. The method of claim 1, further comprising:
computing a plurality of second results for a plurality of second dimension members that are related to the first dimension member; and
sending the plurality of second results to the application.

3. The method of claim 2, further comprising determining, by the server, a security level of a user associated with the application, wherein the server is configured to refrain from computing a particular result value for a particular dimension member in response to determining that the security level of the user does not meet a security level requirement associated with the first dimension member.

4. The method of claim 1, wherein the plurality of values corresponds to a range of values, wherein the first set of the plurality of values corresponds to a first subrange of the range of values, wherein the second set of the plurality of values corresponds to a second subrange of the range of values, wherein the first storage location corresponds to a first storage device, and wherein the second storage location corresponds to a second storage device.

5. A computer-readable device storing instructions that, when executed by a computer, cause the computer to perform operations comprising:
generating a mapping table, wherein the mapping table maps dimensions and dimension members of client data to dimensions and dimension members of benchmark data, wherein the dimensions of the client data include a first set of dimensions, wherein the dimensions of the benchmark data include a second set of dimensions, and wherein the first set is different from the second set;
receiving a query that corresponds to a plurality of values corresponding to the client data, wherein a first storage location stores a first subset of the client data that corresponds to a first set of the plurality of values and a second storage location stores a second subset of the client data that corresponds to a second set of the plurality of values, wherein the first storage location is different from the second storage location, wherein the query identifies a selection of a measure, a particular dimension member of the client data, and an external benchmark from an application executed by a computing device, wherein the particular dimension member is associated with a first dimension level of a plurality of hierarchically arranged dimension levels in an ontology;
determining that the first subset of the client data corresponds to the first set of the plurality of values and the second subset of the client data corresponds to the second set of the plurality of values;
responsive to receiving the query, dividing the query into a plurality of data requests, the plurality of data requests including a first request with respect to the first subset and a second request with respect to the second subset;
computing a client result value of the measure for the particular dimension member based on a combination of a plurality of responses to the plurality of data requests, wherein computing the client result value comprises executing a multidimensional operation on client data corresponding to the particular dimension member;
upon determining that the benchmark data corresponding to the external benchmark does not include a dimension member that matches the particular dimension member in the first dimension level:
  automatically identifying a plurality of dimension members of the benchmark data based on the mapping table, wherein each of the plurality of dimension members of the benchmark data is a hierarchical descendant of the particular dimension member in the ontology; and
  determining a benchmark result value of the measure based on each of the plurality of dimension members of the benchmark data; and
sending the client result value and the benchmark result value to the application.

6. The computer-readable device of claim 5, wherein the benchmark result value comprises an extrapolated or forecasted value that is determined based on a model.

7. The computer-readable device of claim 5, wherein the operations further comprise:
  receiving a selection of a first dimension member;
  computing the client result value and the benchmark result value for the first dimension member;
  computing an additional client result value for a second dimension member that has a hierarchical relationship to the first dimension member; and
  computing an additional benchmark result value for the second dimension member.

8. The computer-readable device of claim 5, wherein:
  the measure is associated with a salary cost, a benefits cost, a paid leave cost, a supplemental pay cost, or an insurance cost, and the external benchmark comprises an employer costs for employee compensation (ECEC) benchmark, or
  the measure is associated with a time to fill, a turnover rate, or a retention rate, and the external benchmark comprises a local area unemployment statistics (LAUS) benchmark.

9. The computer-readable device of claim 5, wherein:
  the measure is associated with a time to fill, a turnover rate, or a retention rate; and
  the external benchmark comprises a local area unemployment statistics (LAUS) benchmark.

10. The computer-readable device of claim 5, wherein the operations further comprise:
  generating a security token;
  sending the security token to an external data source; and
  receiving the benchmark data from the external data source based on the security token.

11. The computer-readable device of claim 5, wherein a mapping of dimension members of the benchmark data to dimension members of the client data is generated based at least in part on the ontology.

12. An apparatus comprising:
a processor; and
a memory coupled to the processor and storing instructions that, when executed by the processor, cause the processor to perform operations comprising:
  generating a mapping table, wherein the mapping table maps dimensions and dimension members of client data to dimensions and dimension members of benchmark data, wherein the dimensions of the client data include a first set of dimensions, wherein the dimensions of the benchmark data include a second set of dimensions, and wherein the first set is different from the second set;
  receiving a selection of a measure, a first dimension member of the client data, and an external benchmark, wherein the first dimension member is associated with a first dimension level of a plurality of hierarchically arranged dimension levels in an ontology;
  sending a query to a server, the query corresponding to a plurality of values corresponding to the client data, wherein a first storage location stores a first subset of the client data that corresponds to a first set of the plurality of values and a second storage location stores a second subset of the client data that corresponds to a second set of the plurality of values, wherein the query is subdivided into a plurality of data requests, the plurality of data requests including a first request with respect to the first subset and a second request with respect to the second subset;
  receiving a plurality of result values from the server in response to the query, wherein the plurality of result values includes a client result value and a benchmark result value for the first dimension member and for a second dimension member, wherein, upon a determination that the benchmark data does not include a dimension member that matches the first dimension member in the first dimension level, a plurality of dimension members of the benchmark data is identified based on the mapping table, and the benchmark result value for the first dimension member is determined based on a model that relates the first dimension member to the plurality of dimension members of the benchmark data, wherein each of the plurality of dimension members is a hierarchical descendant of the first dimension member in the ontology; and
  generating a graphical user interface (GUI) that indicates the client result value and the benchmark result value for the first dimension member and the second dimension member.

13. The apparatus of claim 12, wherein the mapping table is generated based on standards data, wherein the mapping table maps the dimensions and the dimension members of the client data and the dimensions and the dimension members of the benchmark data to dimensions from the standards data, and wherein the standards data is different from the client data and the benchmark data.

14. The method of claim 1, wherein the first dimension member corresponds to a particular geographical region, wherein the plurality of dimension members corresponds to a plurality of sub-regions of the particular geographical region, and wherein the plurality of data requests are sent in parallel.

15. The method of claim 1, further comprising computing, by the server, the benchmark result value of the measure based on the dimension member that matches the first dimension member upon determining that the benchmark data associated with the external benchmark does include the dimension member that matches the first dimension member in the first dimension level.

16. The computer-readable device of claim 5, wherein calculating the benchmark result value based on each of the plurality of dimension members includes performing the multidimensional operation on benchmark data corresponding to a logical union of the plurality of dimension members.

17. The method of claim 1, wherein generating the mapping table comprises:
  receiving the client data, the benchmark data, and standards data;
  generating mapping rules based on the client data, the benchmark data, and the standards data;
  converting the mapping rules into the mapping table; and if the benchmark data does not include a benchmark dimension member that matches a client dimension member of the client data, mapping the client dimension member to one or more hierarchical descendants of the client dimension member.

18. The method of claim 1, further comprising, responsive to receiving the query, determining whether to divide a portion of the client data into shards, wherein the determining is based on a size of the portion of the client data, the size determined at the server, or is based on a filtering parameter stored at a memory that is located at the server or that is coupled to the server.

19. The computer-readable device of claim 5, wherein the operations further comprise, responsive to receiving the query, determining whether to divide a portion of the client data into shards, the determining based on a size of the portion of the client data, the size determined at a server, or based on a filtering parameter stored at a memory that is located at the server or that is coupled to the server.

20. The apparatus of claim 12, wherein the client result value is based on a determination of whether to divide a portion of the client data into shards, the determination based on a size of the portion of the client data or based on a filtering parameter stored at a memory that is located at the server or that is coupled to the server.

* * * * *